United States Patent
Lomeli et al.

(10) Patent No.: US 12,527,609 B2
(45) Date of Patent: Jan. 20, 2026

(54) IMPLANT CONTAINERS AND RELATED METHODS

(71) Applicant: MEDOS INTERNATIONAL SARL, Le Locle (CH)

(72) Inventors: Roman Lomeli, Plymouth, MA (US); Benjamin Powers, Columbia City, IN (US); Joshua Raker, Waynesville, OH (US); Philipp Hoetzl, Mattapan, MA (US)

(73) Assignee: Medos International Sàrl, Le Locle (CH)

( * ) Notice: Subject to any disclaimer, the term of this patent is extended or adjusted under 35 U.S.C. 154(b) by 0 days.

(21) Appl. No.: 18/097,161

(22) Filed: Jan. 13, 2023

(65) Prior Publication Data

US 2023/0225777 A1    Jul. 20, 2023

Related U.S. Application Data

(60) Provisional application No. 63/299,871, filed on Jan. 14, 2022.

(51) Int. Cl.
| | |
|---|---|
| *B65D 25/10* | (2006.01) |
| *A61B 17/86* | (2006.01) |
| *A61L 2/26* | (2006.01) |
| *A61B 50/00* | (2016.01) |
| *A61B 50/30* | (2016.01) |

(52) U.S. Cl.
CPC ............. *A61B 17/865* (2013.01); *A61L 2/26* (2013.01); *A61B 2050/005* (2016.02); *A61B 2050/3015* (2016.02)

(58) Field of Classification Search
CPC ...... A61B 2050/3015; A61B 2050/005; A61B 17/865; A61L 2/26; B65D 52/10; B65D 25/10; A61C 8/0087
USPC ........................ 206/63.5, 570, 363, 438, 368
See application file for complete search history.

(56) References Cited

U.S. PATENT DOCUMENTS

| | | | | |
|---|---|---|---|---|
| 5,582,299 | A * | 12/1996 | Lazzara | A61C 8/0087 206/63.5 |
| 5,829,591 | A * | 11/1998 | Lyons | B65D 21/086 220/8 |
| 5,996,779 | A * | 12/1999 | Klardie | A61C 8/0087 215/350 |
| 6,736,820 | B2 | 5/2004 | Biedermann et al. | |
| 6,974,460 | B2 | 12/2005 | Carbone et al. | |
| 7,087,057 | B2 | 8/2006 | Konieczynski et al. | |
| 7,179,261 | B2 | 2/2007 | Sicvol et al. | |
| 7,451,870 | B2 * | 11/2008 | Donahoe | A61B 50/30 220/826 |
| 9,220,582 | B2 * | 12/2015 | Thome | A61C 8/0087 |
| 9,775,660 | B2 | 10/2017 | Spratt et al. | |

(Continued)

*Primary Examiner* — Steven A. Reynolds
(74) *Attorney, Agent, or Firm* — Barnes & Thornburg LLP

(57) ABSTRACT

Disclosed herein are implant containers and methods for using same. The implant containers disclosed herein can utilize a single sterile barrier to contain the implant, thereby minimizing a size of the container to facilitate efficient storage and handling of implants while within a container. Further, the implant containers and methods disclosed herein can facilitate ready identification of an implant type and/or size contained within, ease of manufacture of the container, ease of assembly during manufacture, ease of use in removing the implant from the container, etc.

17 Claims, 36 Drawing Sheets

(56) References Cited

U.S. PATENT DOCUMENTS

| | | |
|---|---|---|
| 10,039,578 B2 | 8/2018 | Anderson et al. |
| 10,299,839 B2* | 5/2019 | Sicvol et al. |
| 10,327,857 B2* | 6/2019 | Richart .............. A61B 50/30 |
| 11,129,689 B2* | 9/2021 | Peterson ............. A61B 17/865 |
| 2004/0112781 A1* | 6/2004 | Hofverberg ......... A61C 8/0087 206/363 |
| 2010/0236947 A1* | 9/2010 | Liao .................... A61C 8/0087 206/63.5 |
| 2011/0017623 A1* | 1/2011 | Guenter .............. A61C 8/0087 206/63.5 |
| 2011/0056850 A1* | 3/2011 | Guenter .............. B65D 25/101 206/63.5 |
| 2011/0247947 A1* | 10/2011 | Nihei .................. A61C 8/0087 206/63.5 |
| 2011/0288599 A1 | 11/2011 | Michielli et al. |
| 2013/0053901 A1 | 2/2013 | Cormier et al. |
| 2014/0166508 A1* | 6/2014 | Richard .............. A61C 8/0087 206/63.5 |
| 2014/0202892 A1* | 7/2014 | Thome ................ A61C 8/0087 206/63.5 |
| 2017/0095308 A1* | 4/2017 | Roesler ............... A61B 50/30 |
| 2018/0325569 A1 | 11/2018 | Ramsay et al. |
| 2019/0336188 A1* | 11/2019 | Agarwal ............ A61B 17/7032 |
| 2020/0155207 A1* | 5/2020 | D'Andrea ........... A61B 50/20 |
| 2022/0061948 A1* | 3/2022 | Richart .............. A61B 50/20 |

\* cited by examiner

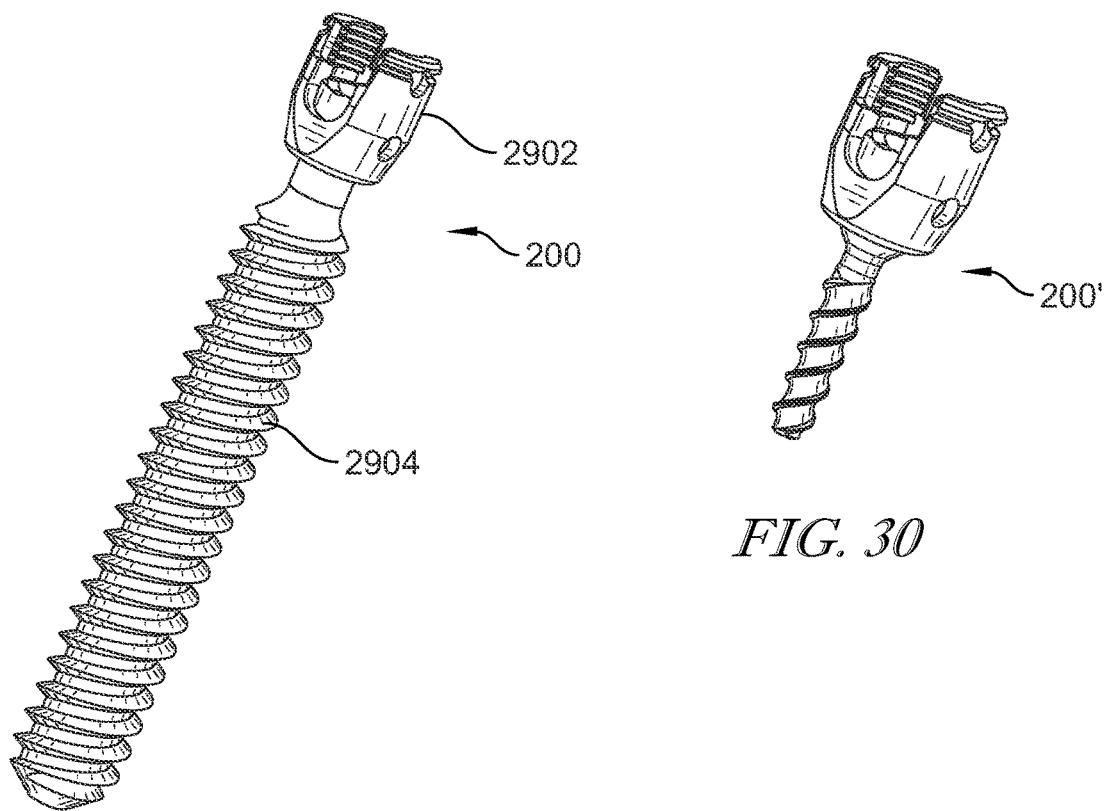
FIG. 29
FIG. 30
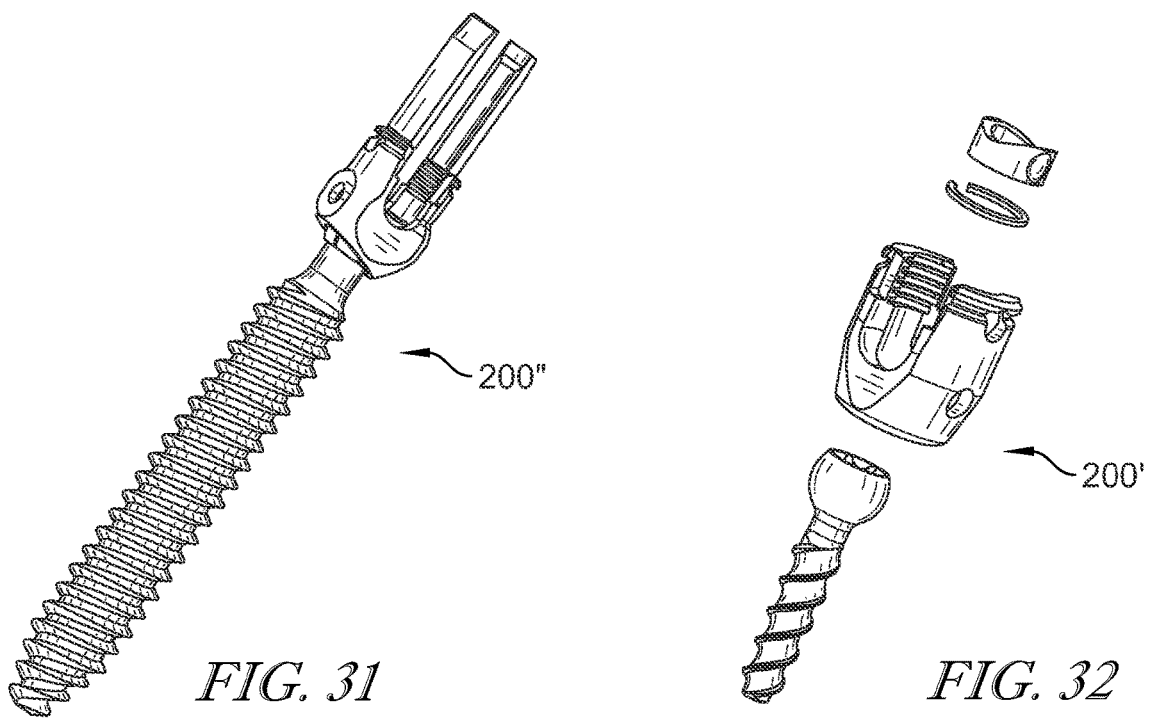
FIG. 31
FIG. 32

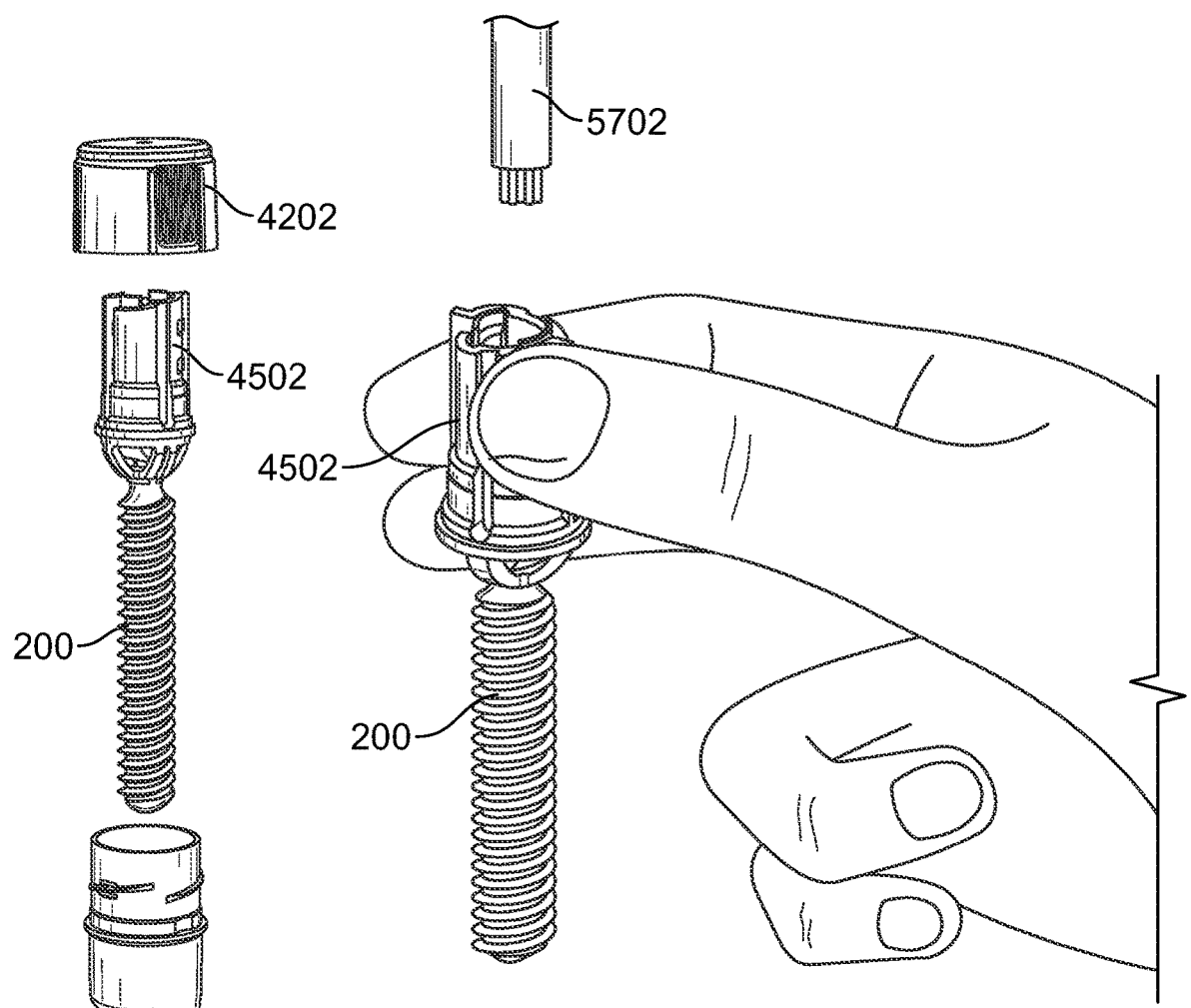
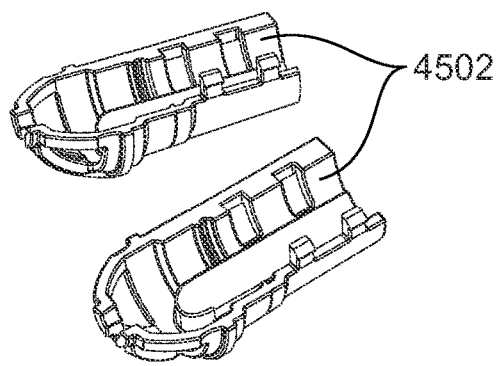
FIG. 56
FIG. 57
FIG. 58

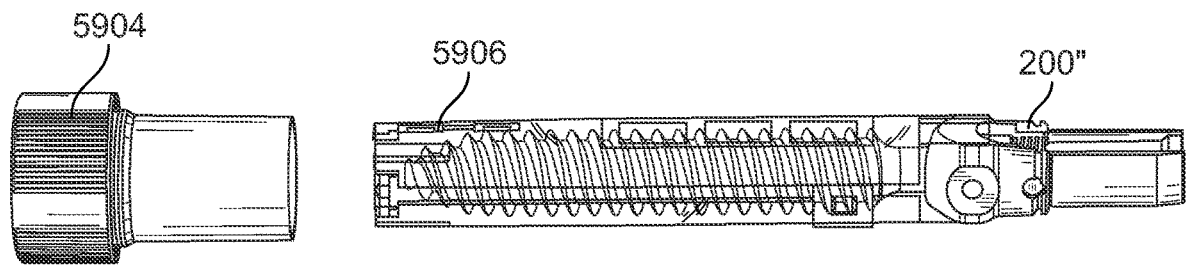
FIG. 71
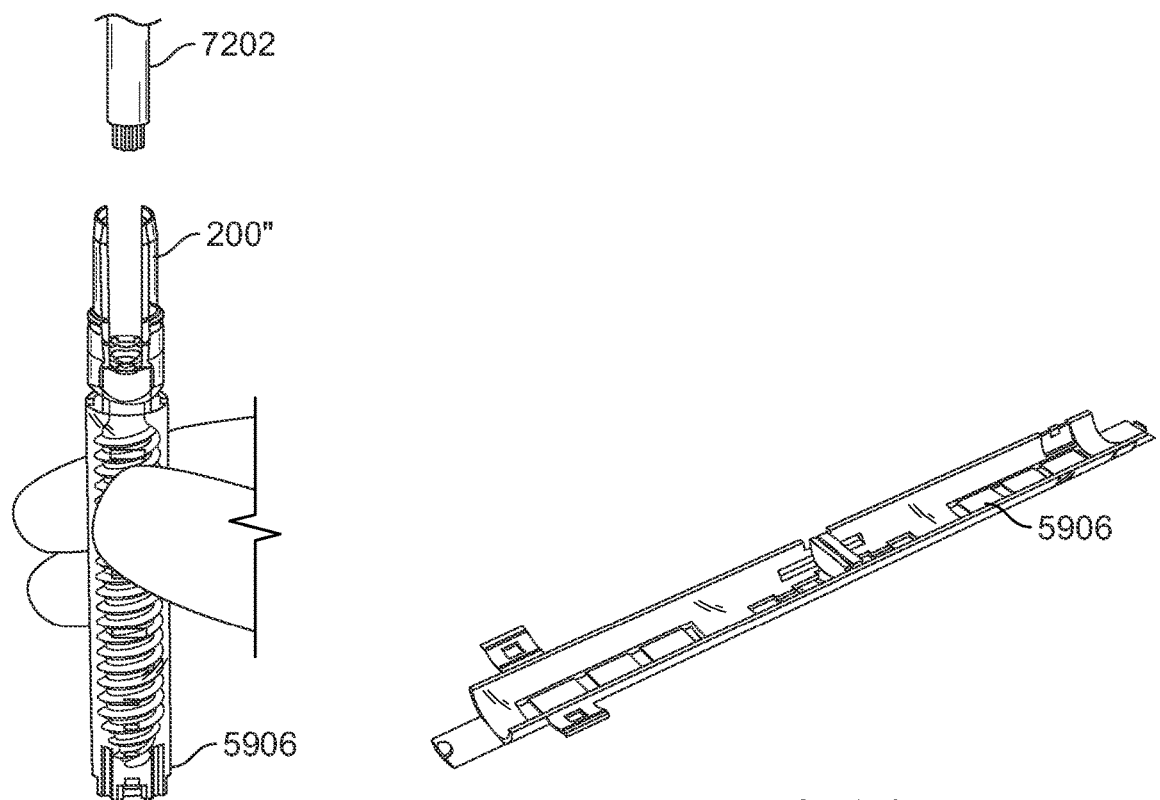
FIG. 72
FIG. 73

IMPLANT CONTAINERS AND RELATED METHODS

CROSS-REFERENCE TO RELATED APPLICATIONS

This application claims the benefit of U.S. Provisional Application No. 63/299,871, entitled "Implant Containers and Related Methods," filed on Jan. 14, 2022. The entire contents of this application are hereby incorporated by reference in their entirety.

FIELD

This disclosure relates generally to containers for surgical implants and, more particularly, to such containers that can maintain sterility of an implant during handling prior to use in a surgical procedure.

BACKGROUND

During surgical procedures, it is necessary to maintain a sterile environment. As such, procedures that require multiple tools and implants, such as spinal operations in which a plurality of bone anchors may be used, can be time consuming because a number of different implants must be sterilized before use. Additionally, many bone anchors are provided to users on a large tray with numerous different sizes and configurations. In such a case, a user is required to sterilize the entire tray even if an operation only requires a small number of the bone anchors on the tray, and a user must pay for, maintain, and ensure proper training is provided for any implant sterilization equipment.

Prior attempts to address these and other issues have produced individual implant containers, but these can include multiple containers nested within one another that can add significant size relative to a size of the implant itself. This can become particularly problematic as implant size increases, e.g., when using larger bone anchors associated with certain spinal procedures in comparison to smaller bone anchors utilized in other procedures, because the size of the packaged implant including its container can be too large to easily accommodate in storage facilities and procedure environments, such as surgical preparation areas adjacent to a sterile operating field, etc.

Furthermore, when utilizing implants packaged in individual containers, as opposed to, e.g., arranged without containers on a tray, it can be difficult to discern what size or type of implant is within a container.

Accordingly, there is a need for improved implant containers.

SUMMARY

Disclosed herein are individual implant containers and methods for using same. The implant containers disclosed herein can provide a number of advantages and address various shortcomings of prior approaches. For example, the implant containers and methods disclosed herein can utilize a single sterile barrier to contain the implant, thereby minimizing a size of the container to facilitate efficient storage and handling of implants while within a container. Further, the implant containers and methods disclosed herein can provide a variety of advantages with regard to facilitating ready identification of an implant type and/or size contained within, ease of manufacture of the container, ease of assembly during manufacture, ease of use in removing the implant from the container, etc.

In one aspect, an implant container includes an outer sleeve having a sealed first end and an open second end, a cap configured to selectively seal the second end of the outer sleeve, and an inner holder configured to be disposed within the outer sleeve. The inner holder can be configured to receive an implant and constrain movement of the implant relative to the inner holder.

Any of a variety of alternative or additional features can be included and are considered within the scope of the present disclosure. For example, in some embodiments, the outer sleeve can include at least one flat portion to prevent rolling. In some embodiments, the at least one flat portion can be transparent and can present a window to view the contents of the outer sleeve.

In certain embodiments, a shape of the outer sleeve and a shape of the inner holder can be configured such that the inner holder can be disposed within the outer sleeve in only one orientation.

In some embodiments, the implant container can further include a tip cap having a projection configured to be received within a slot formed along a length of the inner holder.

In certain embodiments, the inner holder can include a plurality of inward projections configured to constrain movement of the implant.

In some embodiments, the inner holder can include a plurality of identical interlocking components configured to surround a portion of an implant when assembled.

In certain embodiments, the inner holder can include opposed portions connected by a hinge portion such that the opposed portions are configured to surround a portion of an implant when pivoted toward one another about the hinge portion.

In some embodiments, the outer sleeve can include markings formed thereon to denote a length of an implant disposed within the container.

In certain embodiments, the implant container can further include a label disposed on an outer surface of the outer sleeve.

In some embodiments, the implant container can further include an outer case disposed over a portion of the outer sleeve.

In another aspect, a method is provided that includes removing a cap from an outer sleeve to expose an open end of the outer sleeve, the outer sleeve containing an inner holder and an implant. The method further includes passing the inner holder and the implant into a sterile field without contaminating the inner holder and the implant. The method further includes coupling the implant to a surgical instrument without directly contacting the implant by any component other than the surgical instrument. The method further includes separating the inner holder from the implant after coupling the implant to the surgical instrument.

As with the instruments described above, the methods disclosed herein can include any of a variety of additional or alternative steps that are considered within the scope of the present disclosure. For example, in some embodiments the method can further include removing a sealed cover from the outer sleeve prior to removing the cap from the outer sleeve. In certain embodiments, the sealed cover can be shrink-wrapping. In some embodiments, the sealed cover can be an outer case with a break-away tab.

In certain embodiments, the method can further include confirming a length of the implant using a viewing window formed in the outer sleeve and length markings formed on the viewing window.

In some embodiments, the method can further include separating the inner holder from the implant includes exerting opposite forces on tabs extending from a plurality of interlocking components of the holder.

In certain embodiments, separating the inner holder from the implant can include releasing locking tabs and folding opposed portions of the inner holder away from one another about a hinge portion of the inner holder.

Any of the features or variations described herein can be applied to any particular aspect or embodiment of the present disclosure in a number of different combinations. The absence of explicit recitation of any particular combination is due solely to avoiding unnecessary length or repetition.

BRIEF DESCRIPTION OF THE DRAWINGS

The aspects and embodiments of the present disclosure can be more fully understood from the following detailed description taken in conjunction with the accompanying drawings, in which:

FIG. 29 is a perspective view of one embodiment of a bone anchor that can be utilized with the implant containers of the present disclosure;

FIG. 30 is a perspective view of another embodiment of a bone anchor that can be utilized with the implant containers of the present disclosure;

FIG. 31 is a perspective view of another embodiment of a bone anchor that can be utilized with the implant containers of the present disclosure;

FIG. 32 is an exploded view of the bone anchor of FIG. 30;

FIG. 56 illustrates opening an outer sleeve to remove an implant and implant holder according to a method of the present disclosure;

FIG. 57 illustrates handling an implant using an implant holder and coupling to an insertion instrument according to a method of the present disclosure;

FIG. 58 illustrates an implant holder separated into pieces and ready for disposal or recycling;

FIG. 71 illustrates separating a cap from an inner holder and implant according to a method of the present disclosure;

FIG. 72 illustrates handling an implant using an inner holder and coupling to an insertion instrument according to a method of the present disclosure; and FIG. 73 illustrates an inner holder separated from an implant and ready for disposal or recycling.

DETAILED DESCRIPTION

Figure 1:
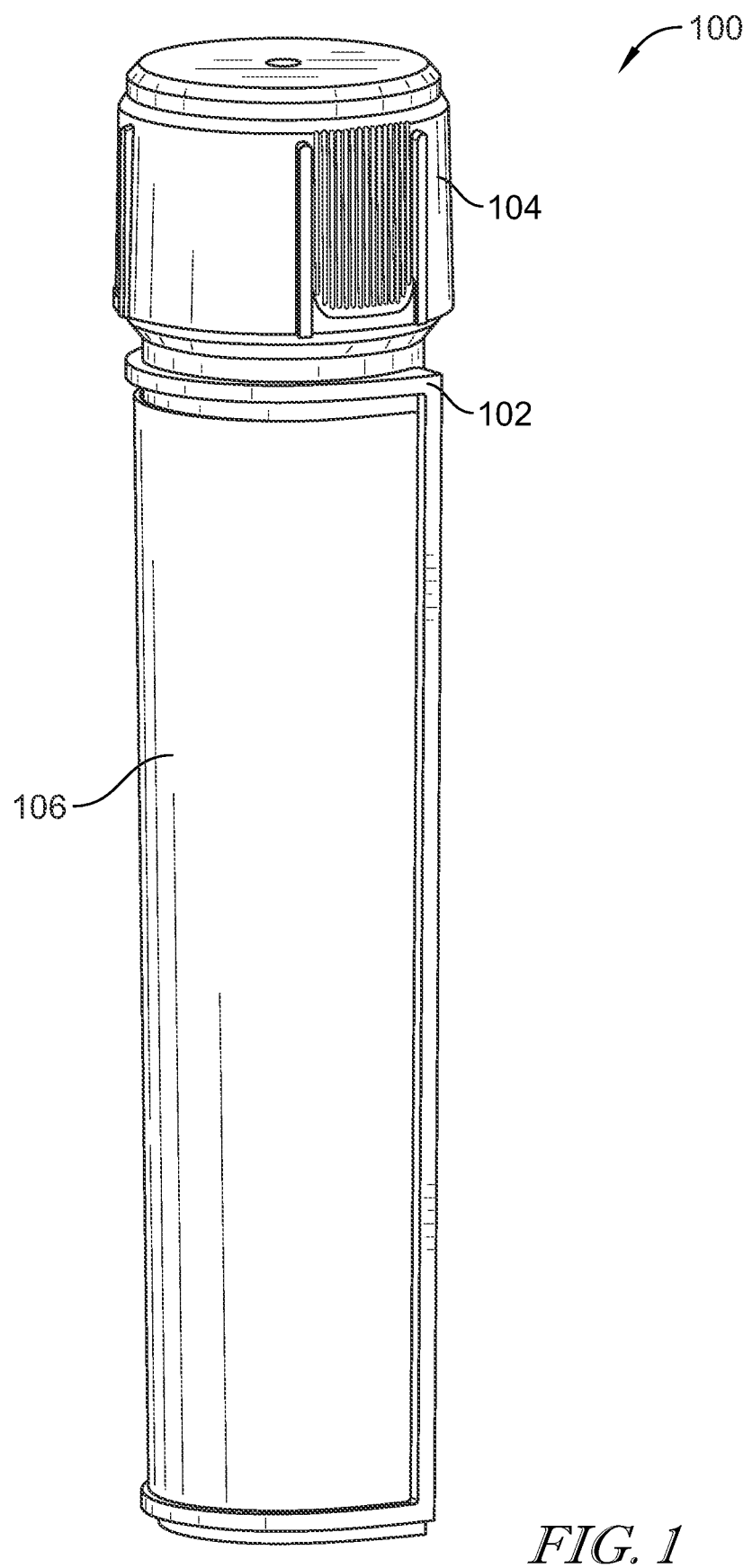
FIG. 1 is a rear perspective view of one embodiment of an implant container according to the present disclosure.
Figures 2, 3:
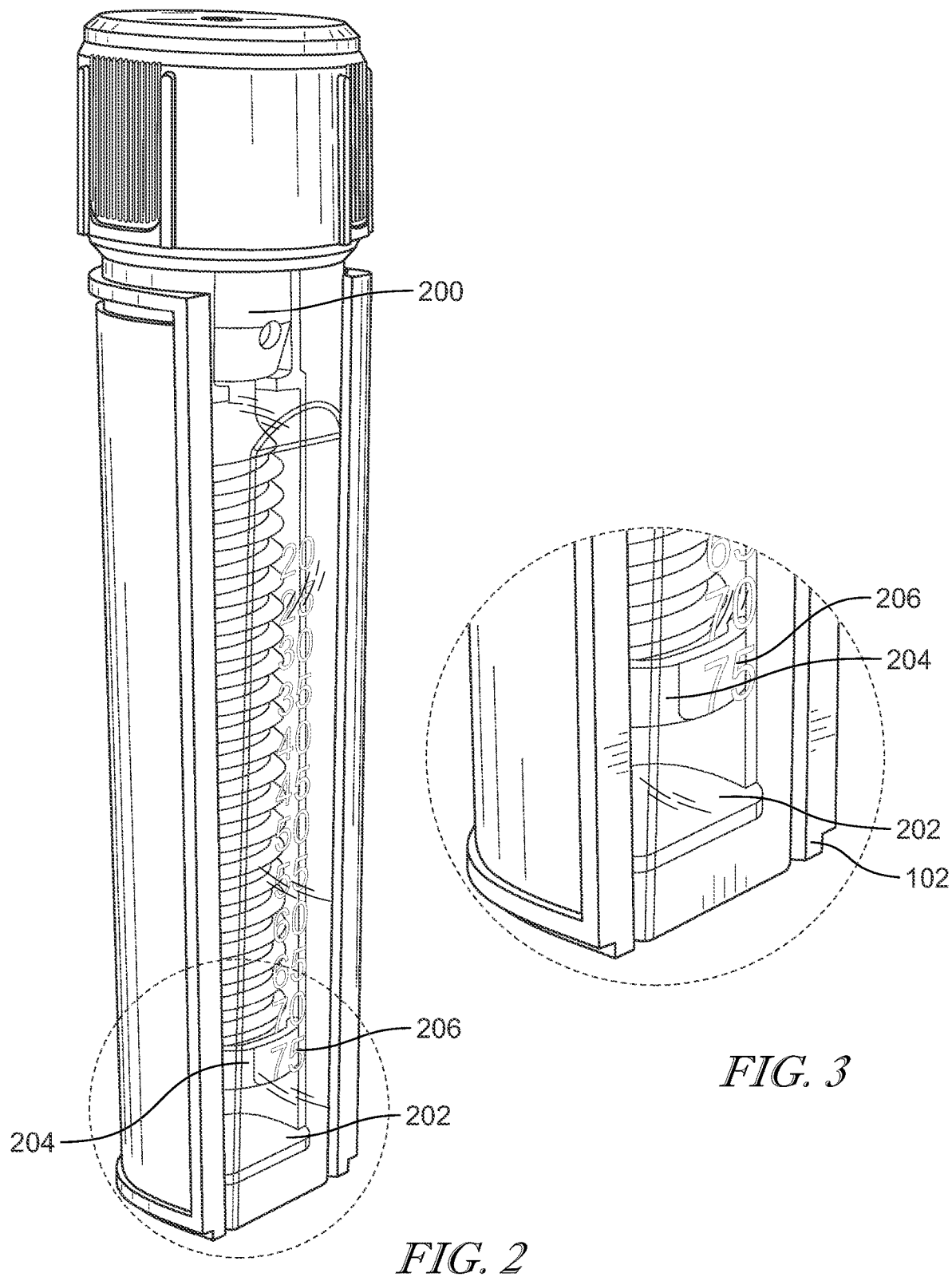
FIG. 2 is a front perspective view of the implant container of FIG. 1.
FIG. 3 is a front perspective detail view of the implant container of FIG. 1.
Figure 4:
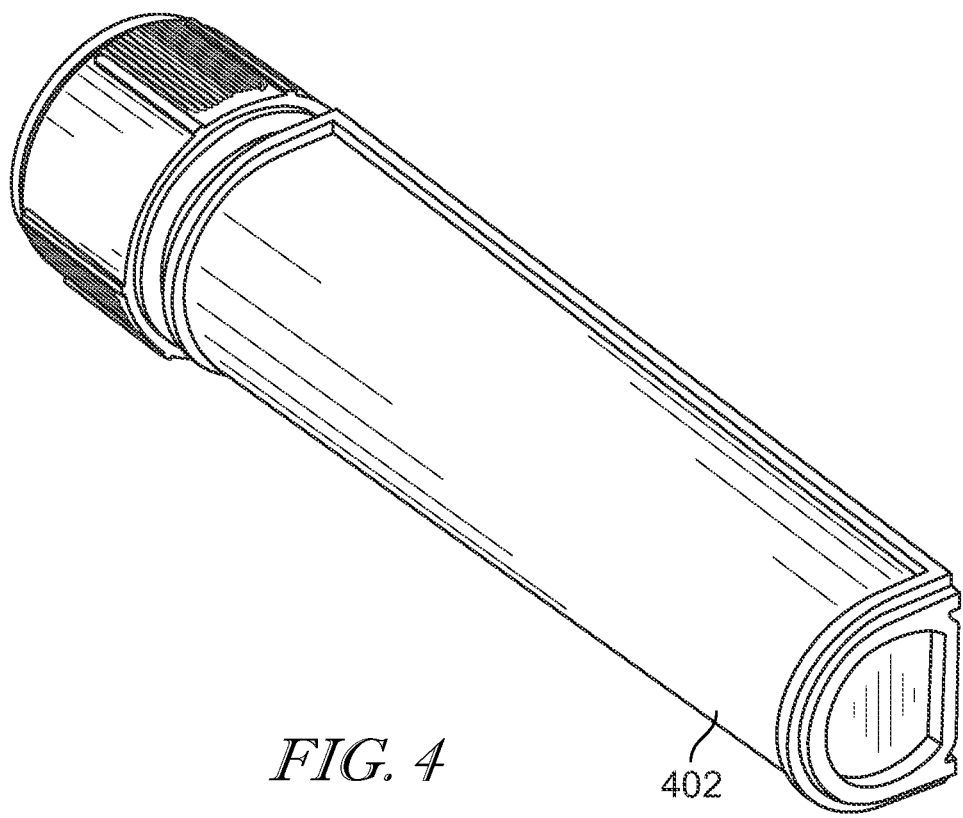
FIG. 4 is a bottom-rear perspective view of the implant container of FIG. 1.
Figure 5:
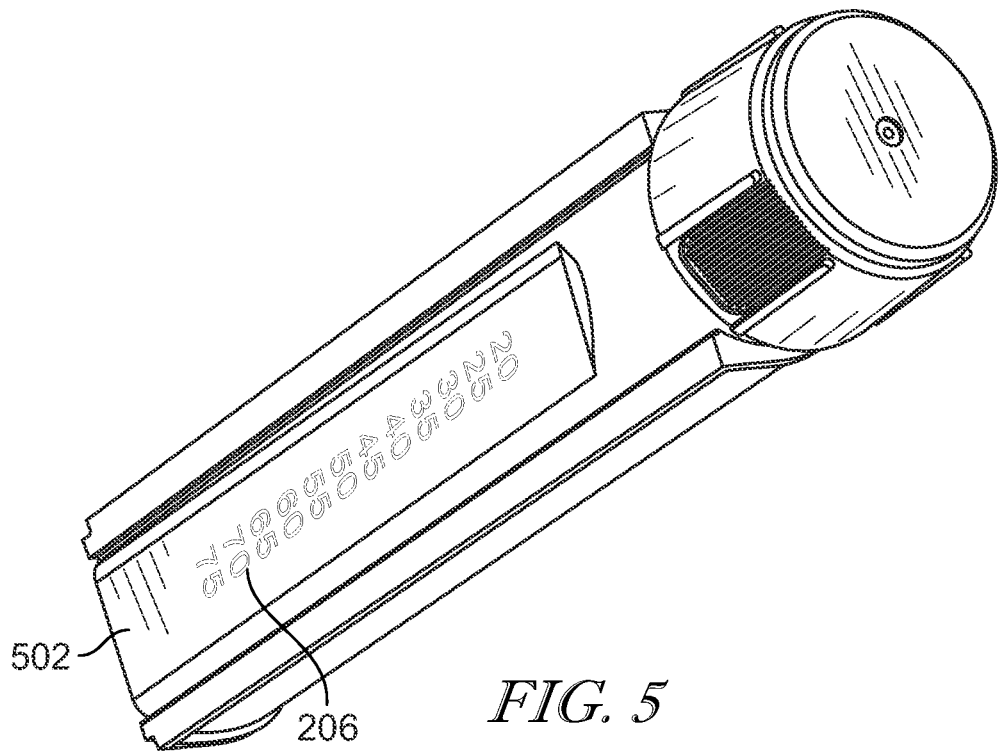
FIG. 5 is a top-front perspective view of the implant container of FIG. 1.
Figure 6:
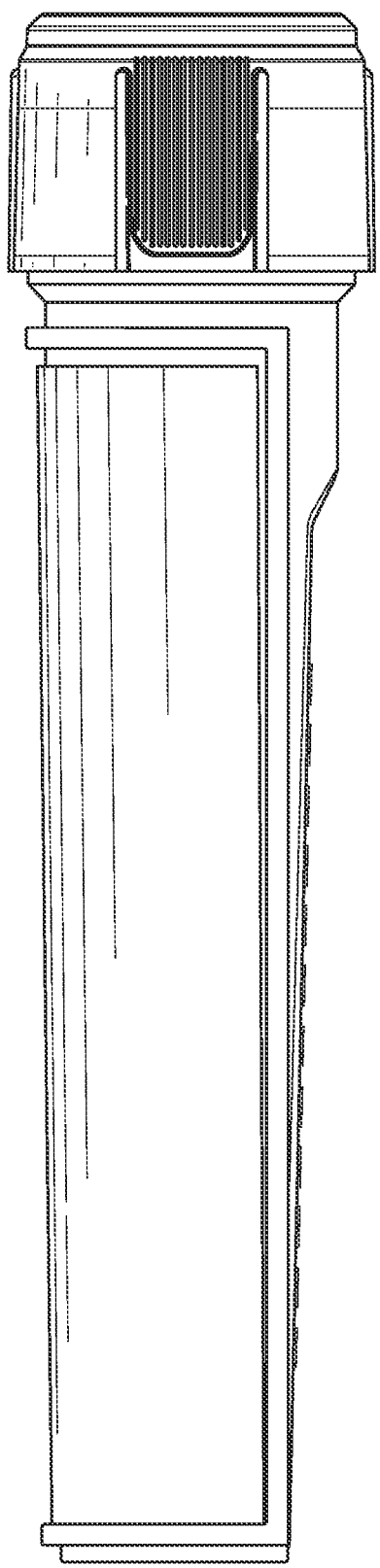
FIG. 6 is a side view of the implant container of FIG. 1.
Figure 7:
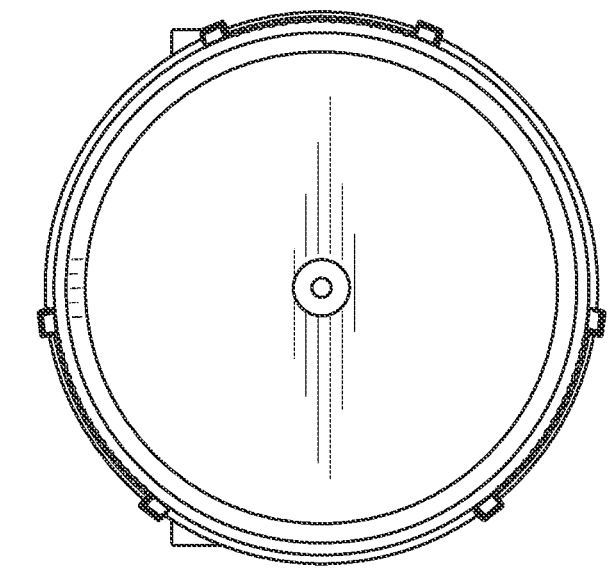
FIG. 7 is a top view of the implant container of FIG. 1.
Figure 8:
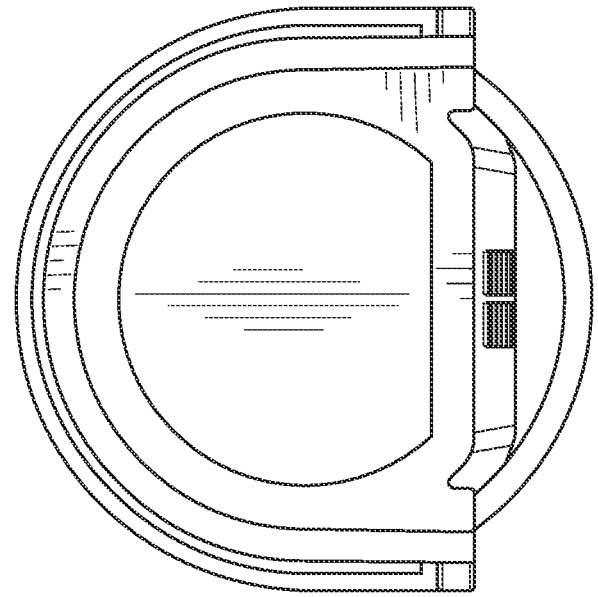
FIG. 8 is a bottom view of the implant container of FIG. 1.
Figure 9:
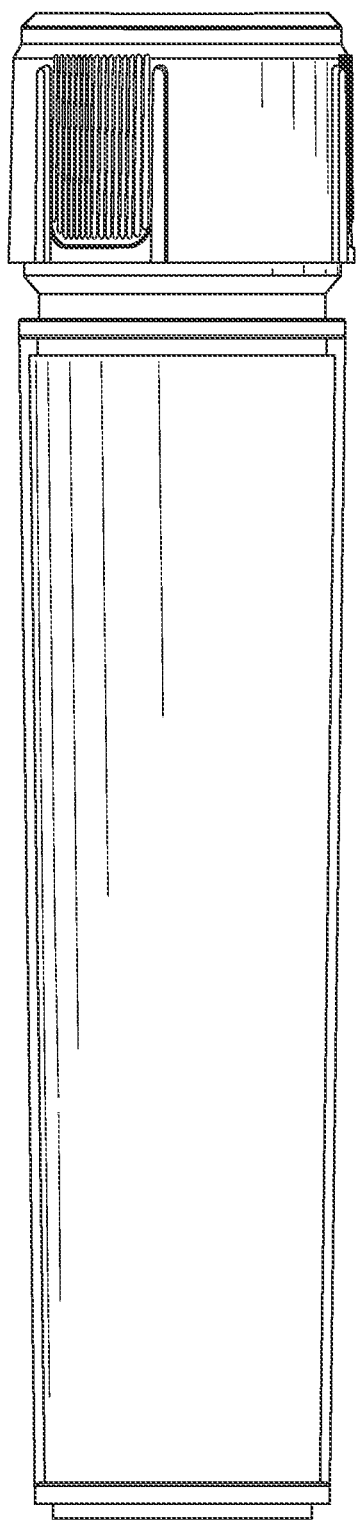
FIG. 9 is a rear view of the implant container of FIG. 1.
Figure 10:
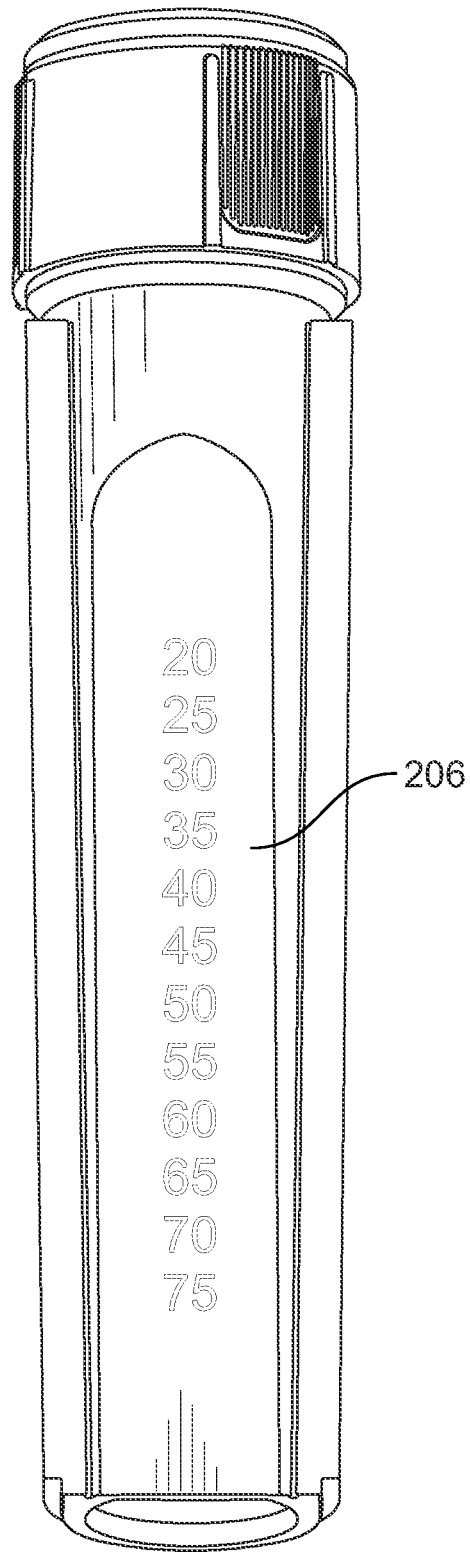
FIG. 10 is a bottom-front perspective view of the implant container of FIG. 1.

Certain example embodiments will now be described to provide an overall understanding of the principles of the structure, function, manufacture, and use of the devices, systems, and methods disclosed herein. One or more examples of these embodiments are illustrated in the accompanying drawings. The devices, systems, and methods specifically described herein and illustrated in the accompanying drawings are non-limiting embodiments. The features illustrated or described in connection with one embodiment may be combined with the features of other embodiments. Such modifications and variations are intended to be included within the scope of the present disclosure. Additionally, to the extent that linear, circular, or other dimensions are used in the description of the disclosed devices and methods, such dimensions are not intended to limit the types of shapes that can be used in conjunction with such devices and methods. Equivalents to such dimensions can be determined for different geometric shapes, etc. Further, like-numbered components of the embodiments can generally have similar features. Still further, sizes and shapes of the devices, and the components thereof, can depend at least on the anatomy of the subject in which the devices will be used, the size and shape of objects with which the devices will be used, and the methods and procedures in which the devices will be used.

The present disclosure generally relates to implant containers. When various individual implants are transported, it can be helpful to maintain a general orientation of an implant to prevent the implant from being damaged during transportation and to minimize any difficulty in removing the implant from its transportation container during deployment. Additionally, it can be beneficial to sterilize and package individual implants in individual transportation containers so that, upon deployment, a user is not required to sterilize the implant and is not required to handle and potentially contaminate more than one implant at a time.

As such, various implant containers are provided herein that include an outer container, such as a tube-like component with a cap, to enclose the implant and an inner holder disposed within the outer container that maintains a position of the implant. The implant holding systems can be designed to accommodate various implants of different types and sizes, such as bone anchors used in spinal operations, and the container can engage a bone anchor disposed therein to assist in maintaining an orientation of the bone anchor relative to the container. That is, the container can engage a bone anchor and maintain it therewithin in a sterile condition. Further, a single container can have the versatility to handle a variety of sizes of bone anchors.

Additionally, one or more of the bone anchor and/or the container, or components thereof, can be sterilized during assembly packaging and maintained in a sterile state until the bone anchor is to be deployed. Typically, the bone anchor is sterilized before placement within the container. This ensures that each bone anchor is sterilized and maintained within its own sterile enclosure, making it possible to use as many bone anchors of different types and sizes during a surgical procedure without compromising the sterility of any bone anchors that are not used during the procedure.

FIGS. 1-73 illustrate various example embodiments of implant containers according to the present disclosure, and a number of features of these embodiments are described below. Additional details on implant containers can also be found in U.S. Pat. No. 11,129,689, entitled "Implant Holder," which is hereby incorporated by reference in its entirety.

Figure 11:
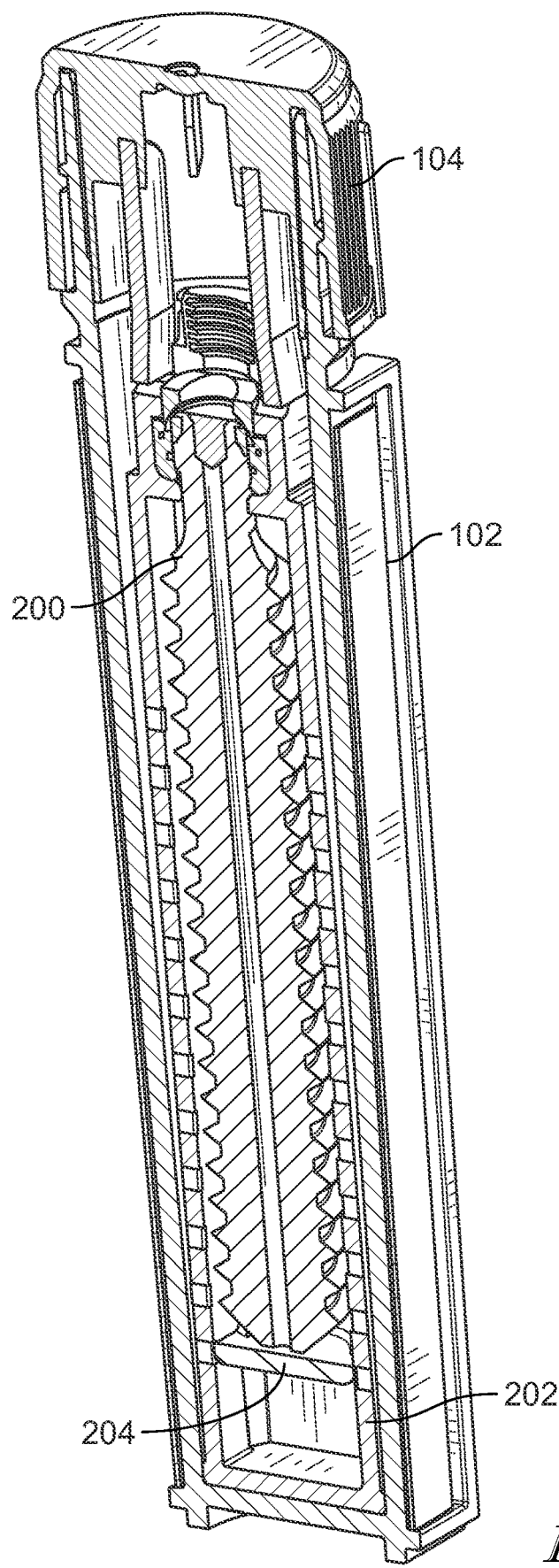
FIG. 11 is a rear perspective longitudinal cross-sectional view of the implant container of FIG. 1.
Figure 12:
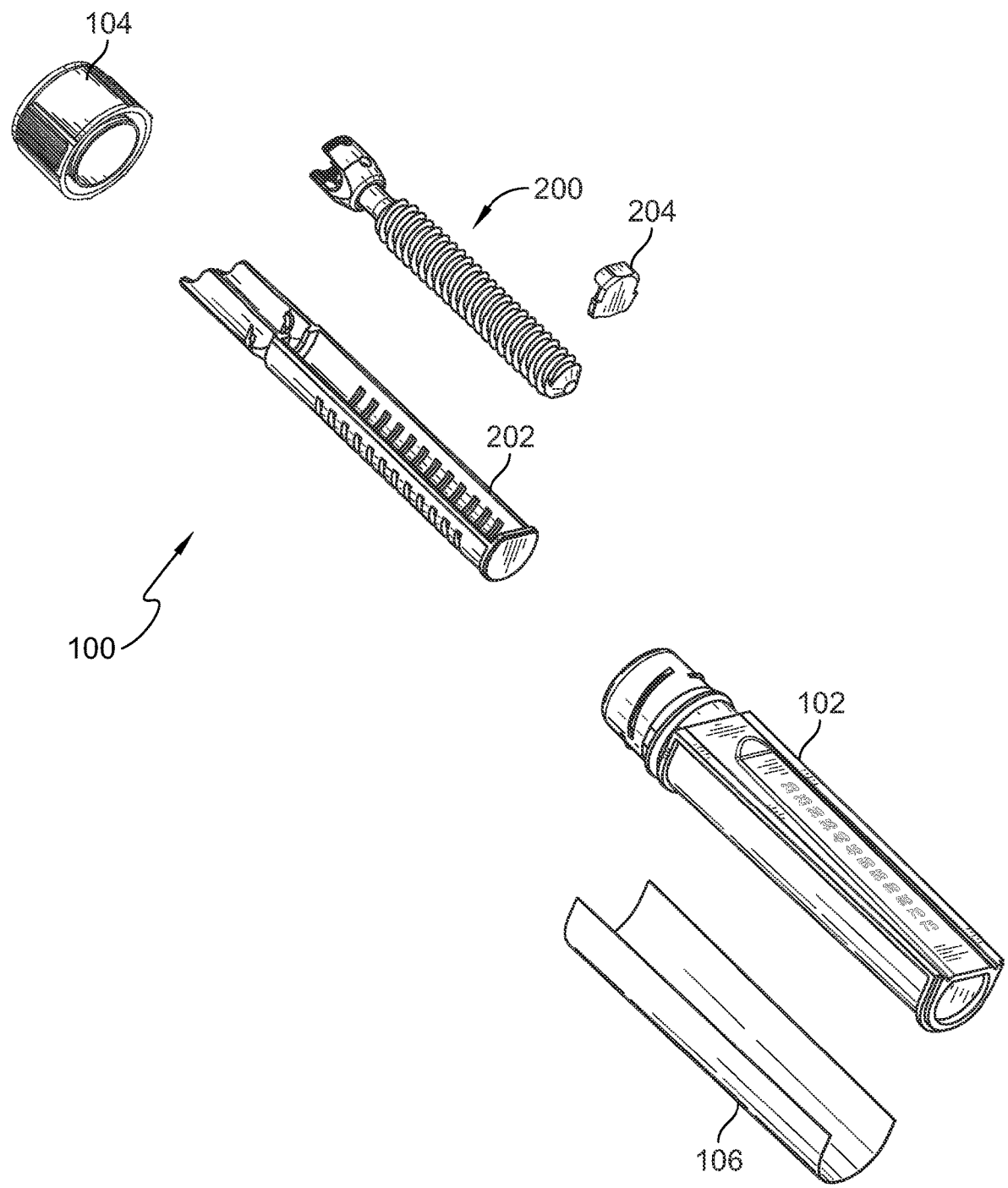
FIG. 12 is an exploded view of the implant container of FIG. 1.
Figure 13:
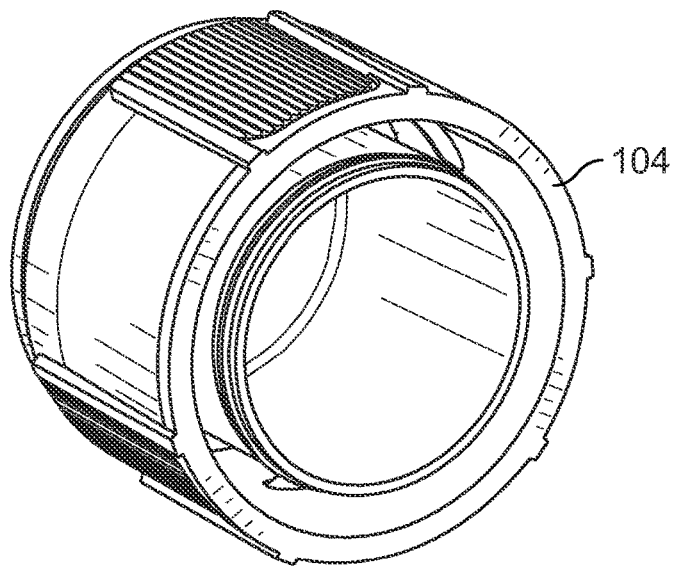
FIG. 13 is a bottom perspective view of a cap of the implant container of FIG. 1.
Figure 14:
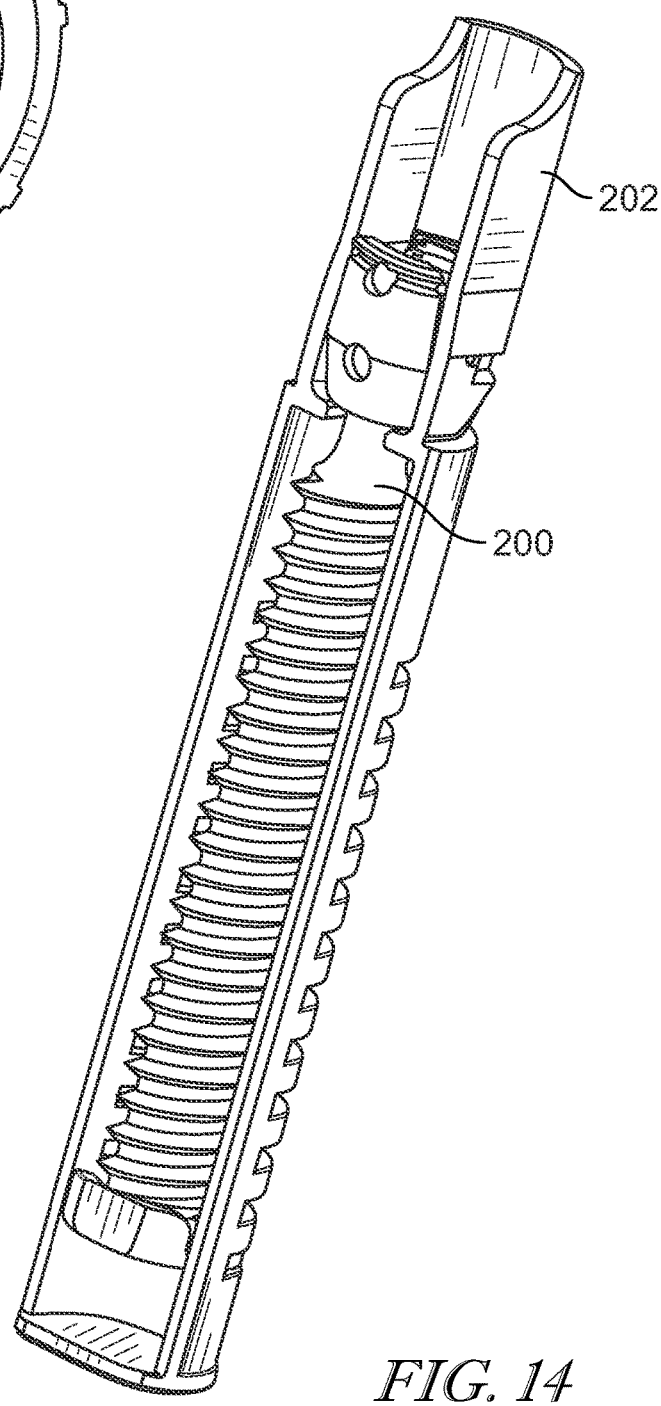
FIG. 14 is a front perspective view of an inner holder of the implant container of FIG. 1.
Figure 15:
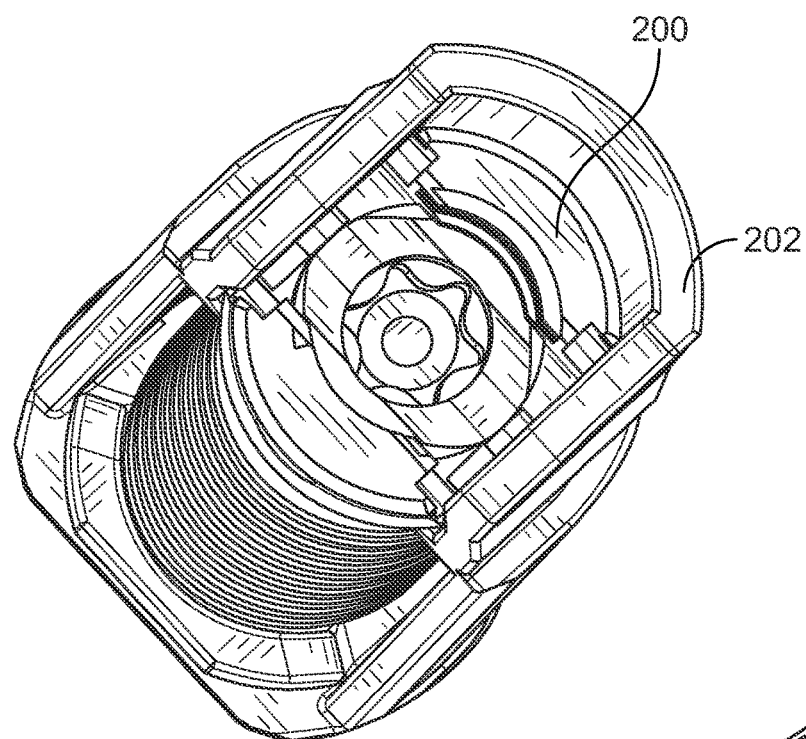
FIG. 15 is a top perspective view of the inner holder of FIG. 14.
Figure 16:
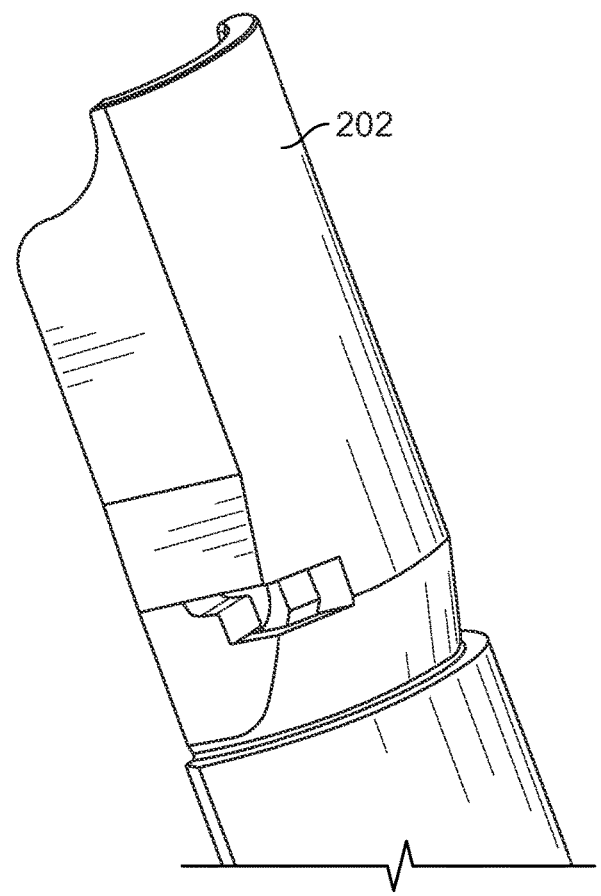
FIG. 16 is a rear perspective detail view of the inner holder of FIG. 14.
Figures 17, 18:
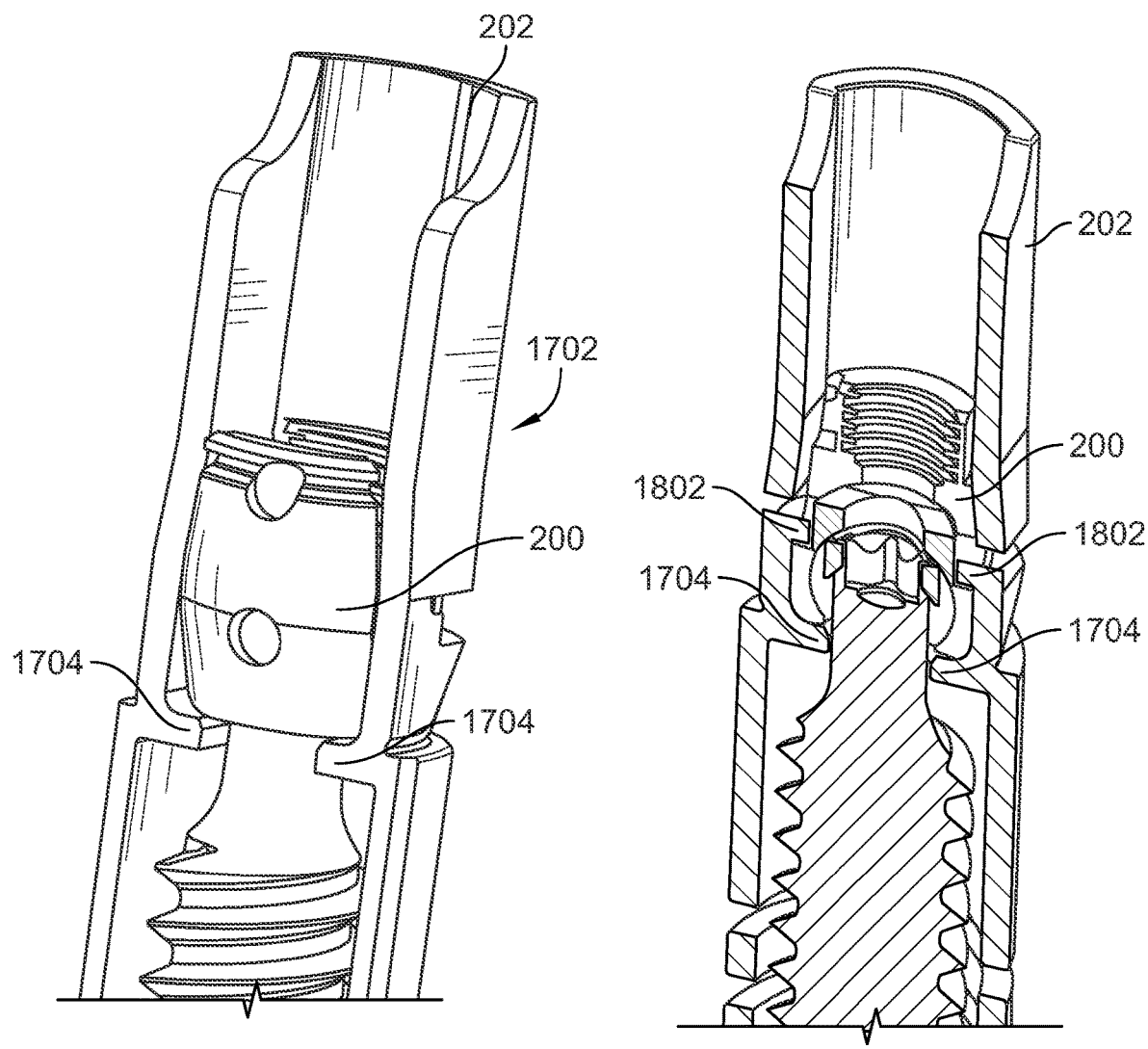
FIG. 17 is a front perspective detail view of the inner holder of FIG. 14.
FIG. 18 is a front-perspective longitudinal cross-sectional view of the inner holder of FIG. 14.
Figure 19:
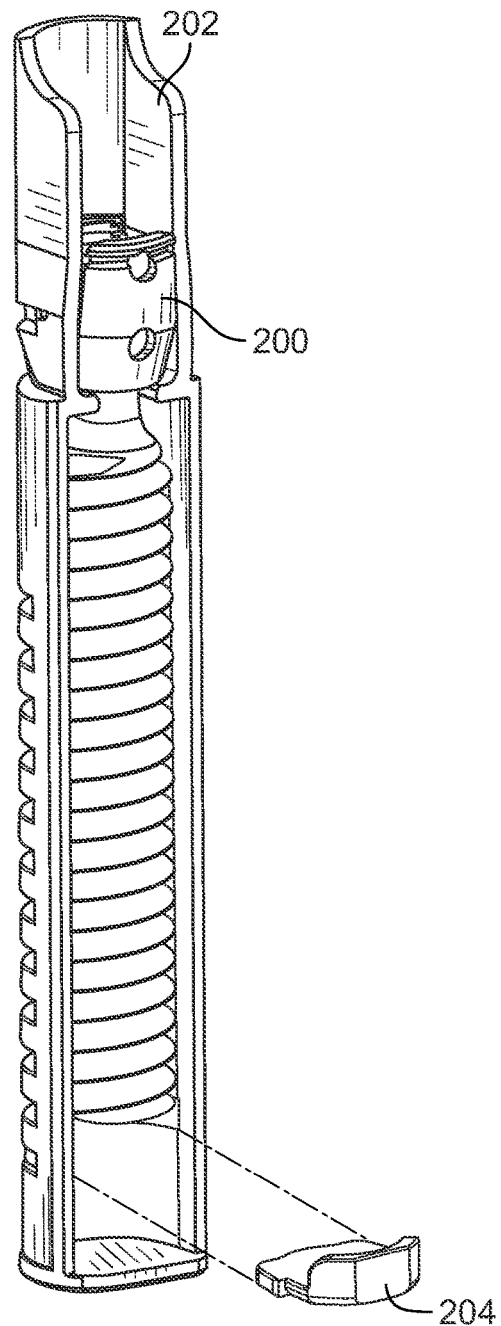
FIG. 19 is a front perspective view of the inner holder of FIG. 14 holding an implant having a first size.
Figure 20:
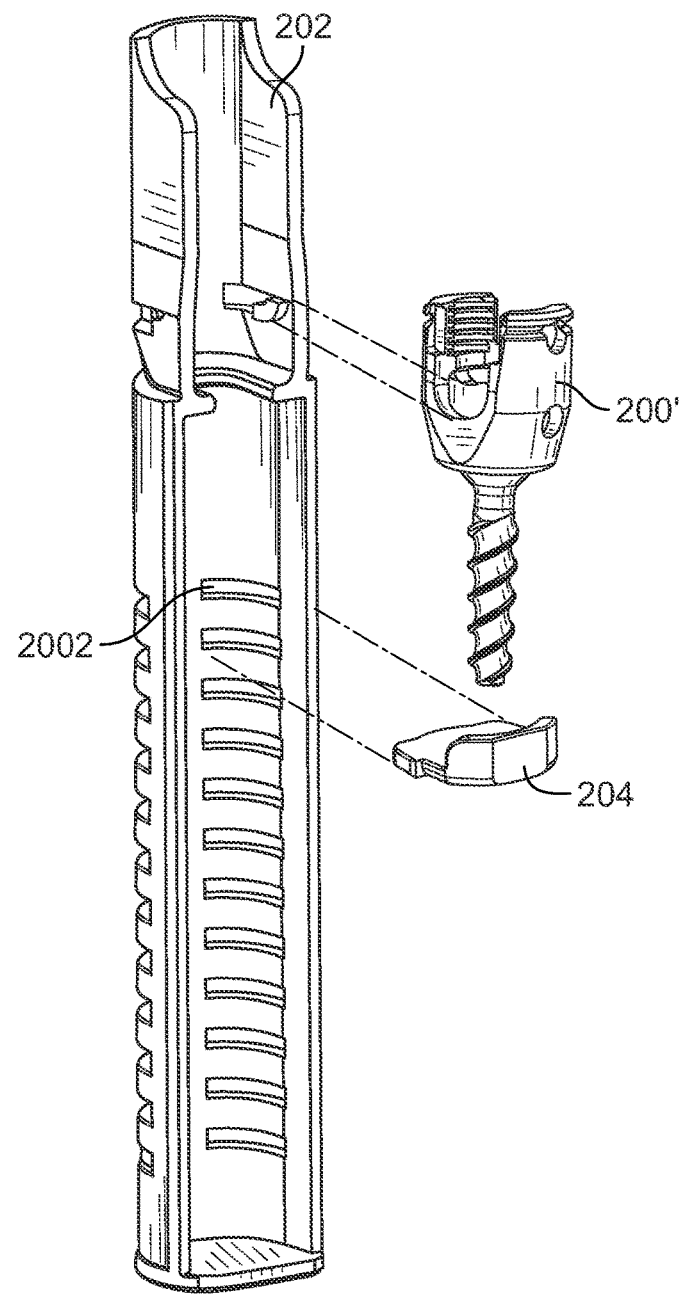
FIG. 20 is a front perspective view of the inner holder of FIG. 14 holding an implant having a second size.
Figure 21:
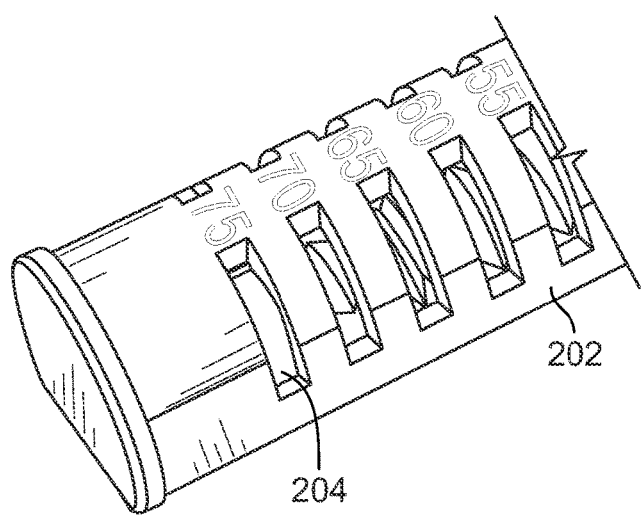
FIG. 21 is a rear perspective detail view of the inner holder of FIG. 14.
Figure 22:
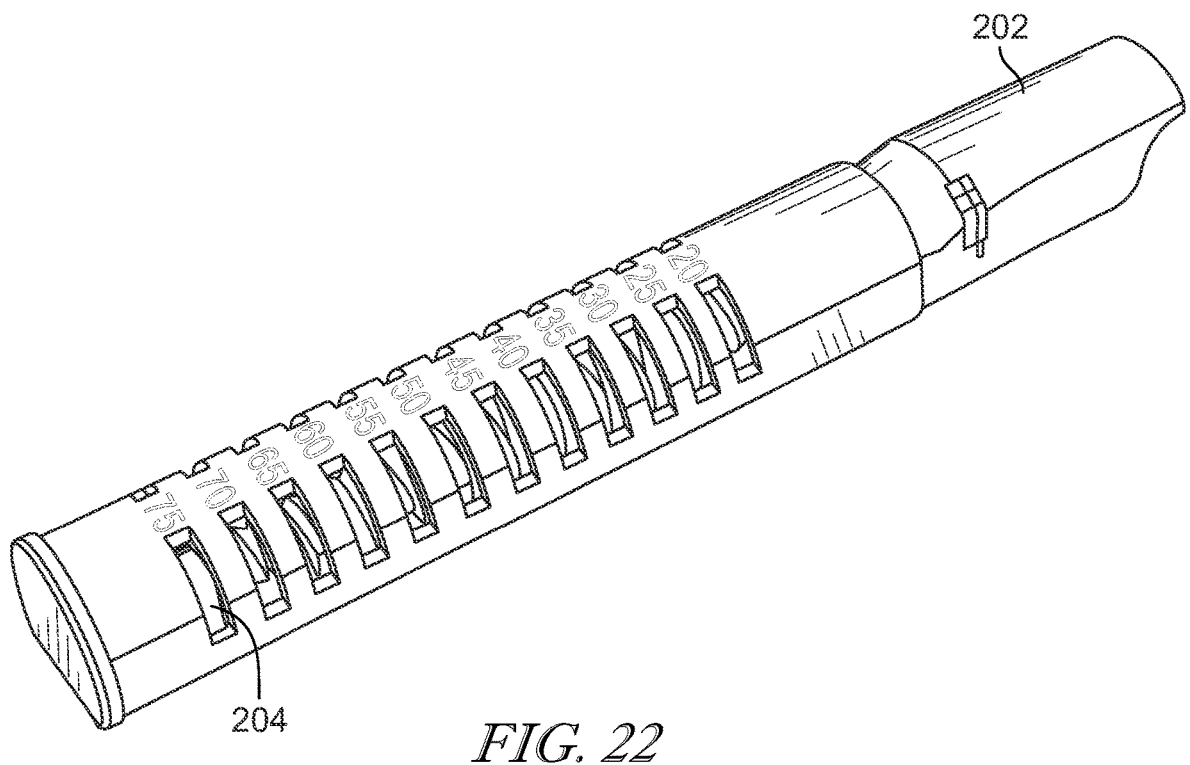
FIG. 22 is a rear perspective view of the inner holder of FIG. 14.
Figure 23:
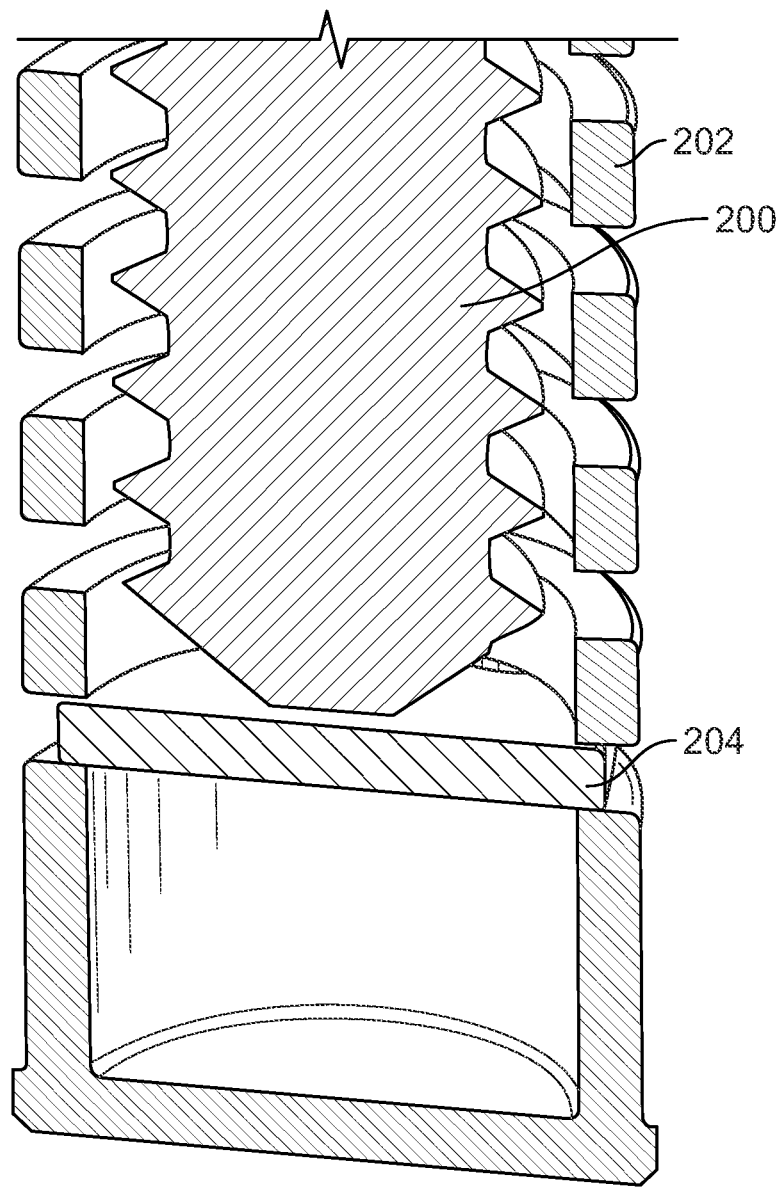
FIG. 23 is a front perspective longitudinal cross-sectional detail view of the inner holder of FIG. 14.
Figure 24:
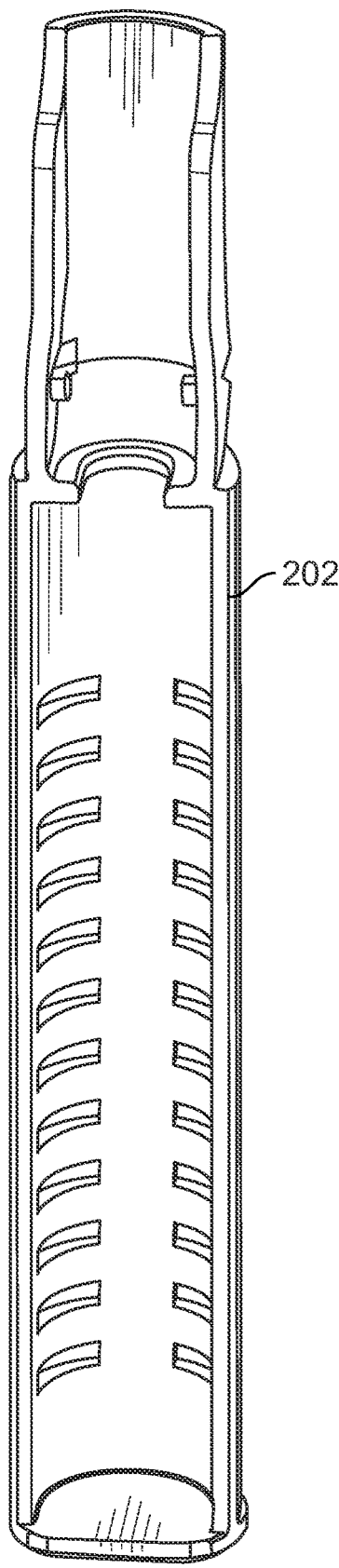
FIG. 24 is a front perspective view of the inner holder of FIG. 14.
Figure 25:
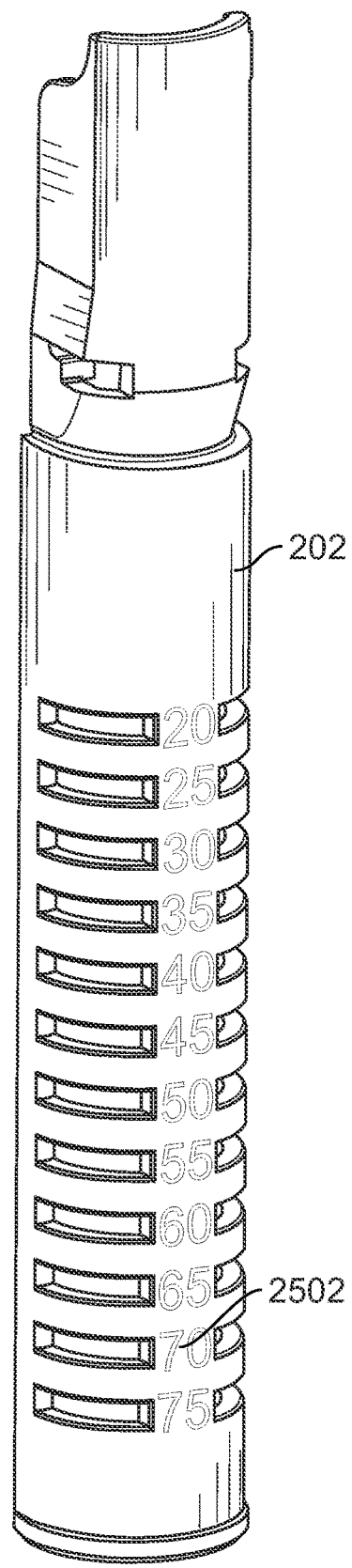
FIG. 25 is a rear perspective view of the inner holder of FIG. 14.
Figure 26:
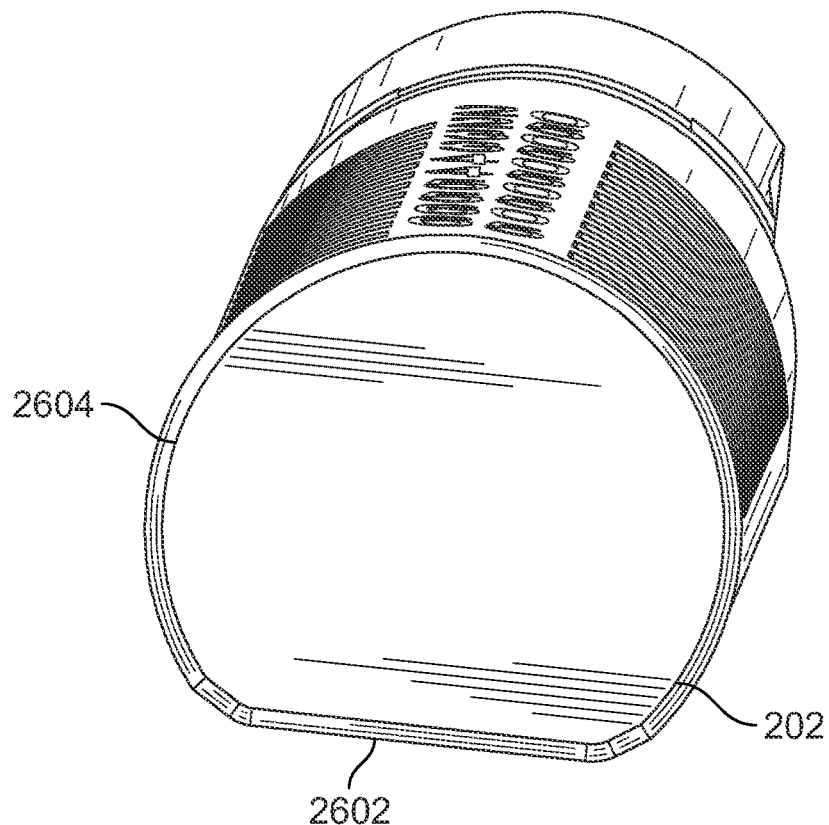
FIG. 26 is a bottom perspective view of the inner holder of FIG. 14.
Figure 27:
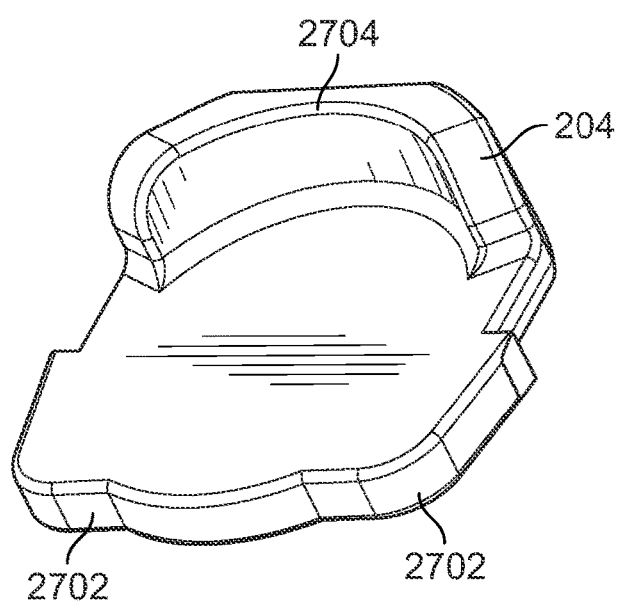
FIG. 27 is a top perspective view of a tip cap of the implant container of FIG. 1.
Figure 28:
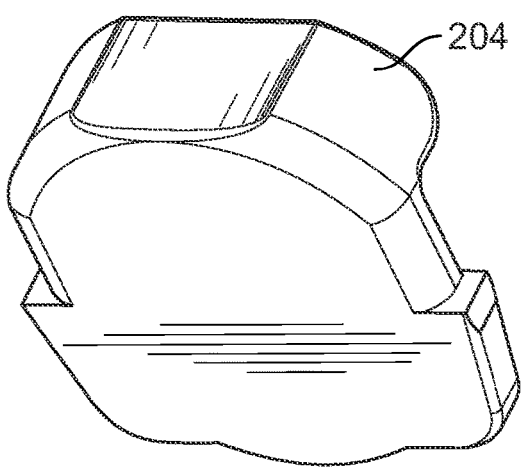
FIG. 28 is a bottom perspective view of the tip cap of FIG. 27.
Figure 33:
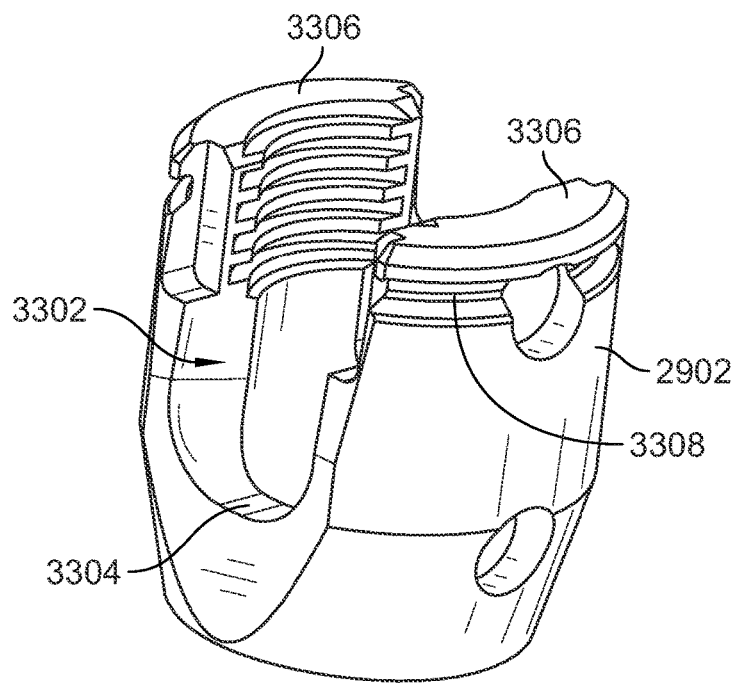
FIG. 33 is a top perspective view of a receiver head of the bone anchor of FIG. 29.
Figure 34:
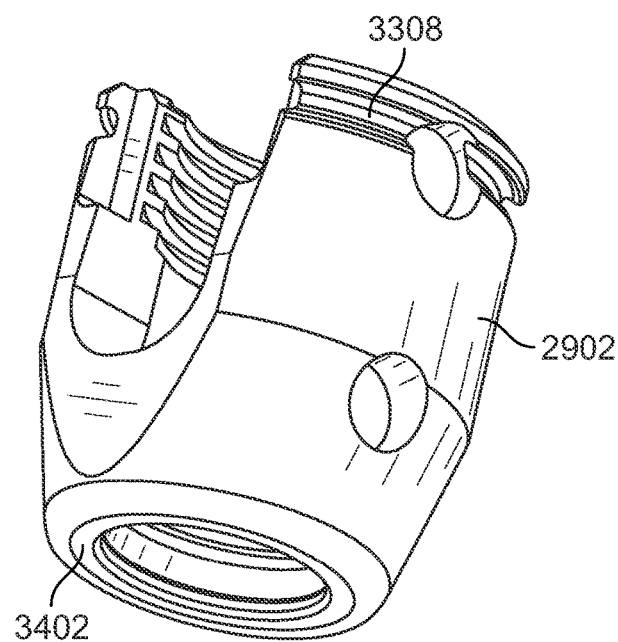
FIG. 34 is a bottom perspective view of the receiver head of FIG. 33.

FIGS. 1-39 illustrate one embodiment of an implant container according to the present disclosure. FIGS. 1-10 show various perspective views of the implant container 100. FIGS. 11 and 12 illustrate longitudinal cross-sectional and exploded views, respectively, of the container 100 and an implant 200. The implant container 100 includes an outer sleeve 102, a cap 104, a label 106, an inner holder 202, and tip cap 204.

The container 100, which is typically shrink-wrapped for distribution, provides a single sterile barrier—formed by the outer sleeve 102 and cap 104—to enclose the implant. The holder 202 is disposed within the outer sleeve with the implant 200 and maintains the implant in a desired position.

The holder 202 also facilitates handling of the implant 200 once it is removed from the outer sleeve 102 without the need to touch the implant itself.

The outer sleeve 102 has an anti-roll geometry with a flat surface 502 opposite a curved surface 402. This prevents unintentional rolling of the container 100 when placed on a flat surface, as well as providing a default or preferred orientation that faces the curved surface 402 upward and prominently displays the label 106 affixed to the surface 402 to a user. Prominently displaying an area of a label in this manner can facilitate any of a variety of identification schemes to aid users in handling the container 100, including, for example, color coding, bar coding, symbol coding, number coding, name coding, etc.

The flat surface 502 opposite the label 106 can be transparent, or have at least some degree of transparency, to facilitate direct viewing of the implant by a user handling the container 100. Further, the surface 502 can include length markings 206 to aid a user in readily determining the implant length based on which marking aligns with a distal end of the implant shank.

While the presence of shrink-wrapping over the outer sleeve and cap can provide a tamper-evident seal, in some embodiments the cap 104 can include a tamper-evident feature as well, such that a user can detect when removing the cap from the outer sleeve whether the cap has been opened/removed previously. Any of a variety of such features can be included.

The inner holder 202 and tip cap 204 are illustrated in more detail in FIGS. 14-28. The holder 202 is configured to be compatible with a variety of bone anchor sizes and types. Example bone anchors that can be utilized with the implant containers of the present disclosure are shown in FIGS. 29-34. These can include mono- or poly-axial bone anchors having a proximal receiver head 2902 configured to seat a spinal fixation element, such as a rod, and a distal screw shank 2904 configured to penetrate into bone, such as a vertebra. The receiver head 2902 can in some embodiments include extended tabs protruding proximally, as shown in FIG. 31. And the distally-extending shank 2904 can have a variety of lengths, diameters, thread forms, and other features, such as fenestrations, etc. One example is shown in comparing the different shank lengths of the relatively-longer implants 200 and 200" in FIG. 29 vs. the relatively shorter implant 200' in FIGS. 30 and 32. Further details regarding bone anchors can be found in U.S. Pat. Nos. 6,974,460; 6,736,820; 7,087,057; 7,179,261; 9,775,660; 10,039,578; and 10,299,839, as well as U.S. Pat. Pub. Nos. 2011/0288599; 2013/0053901; and 2018/0325569. Each of these references is hereby incorporated by reference in its entirety.

The inner holder 202 can have a length sufficient to surround a largest-length bone anchor anticipated for use and can include one or more slots 2002 formed therein along its length that can accommodate projections 2702 formed on the tip cap 204 to fix the tip cap relative to the holder 202. The holder 202 and tip cap 204 can accordingly constrain the movement of the implant 200 relative thereto. In particular, a proximal portion 1702 of the holder 202 can be configured to retain a position of the receiver head 2902 of the implant 200 and the tip cap 204 can be configured to constrain a position of the distal tip of the shank 2904 of the implant.

To this end, the proximal portion 1702 of the holder 202 can include various inward projections configured to abut against portions of the receiver head 2902 to constrain its movement relative to the holder. In the illustrated embodiment, a distal set of projections 1704 abuts a distal-most surface 3402 of the receiver head 2902 and prevents distal movement of the receiver head relative to the holder 202. In addition, a second set of projections 1802 is configured to extend into the U-shaped seat 3302 and abut a distal-most surface 3304 thereof, thereby preventing proximal movement of the receiver head relative to the holder 202. In some embodiments, the shape of the receiver head and dimensions at least between the distal surface 3402 and U-shaped seat 3302 can be uniform across the plurality of different screws accommodated by the holder 202, such that the receiver head of any such screw fits into the proximal portion 1702 of the holder.

The tip cap 204 constrains movement of the distal end of the shank 2904 of the implant 200. The tip cap 204 includes a lip 2704 formed opposite the projections 2702 that interface with the holder 202. The lip 2704 can prevent the distal tip of the shank 2904 from swinging out of the enclosure of the holder 202. In some embodiments, the distal tip of the shank can be permitted to move freely within the area defined by the tip cap between the projections 2702 and the lip 2704. This can effectively allow a single part to work with a variety of shank top geometries. In other embodiments, however, the tip cap can include a projection, depression, or other feature or shape configured to conform to a particular shank tip shape and prevent any movement of the shank relative thereto.

The holder 202 facilitates ready identification of an implant contained therewithin. For example, the illustrated embodiment encloses three sides of the implant but the open side is configured to face the flat surface/viewing window 502 of the outer tube that includes length markings 206 formed thereon. To this end, the holder 202 can include a flat portion 2602 opposite a curved portion 2604 to match the geometry of the outer sleeve 102 and ensure the holder can only be inserted into the outer sleeve in one orientation. Furthermore, once the inner holder 202 is removed from the outer sleeve 102, a user can utilize the length markings 2502 formed on the outer surface of the holder 202 to confirm implant length (in addition to directly viewing the shank through the opening of the holder).

Still further, the proximal portion of the holder 202 maintains the receiver head in an orientation where a side surface of one of the opposed arms 3306 of the receiver head (that form the U-shaped seat 3302) is exposed. This area often includes markings to identify the implant type, length, etc. The receiver head is constrained against rotation relative to the holder so this area is always visible through the open side thereof, and can be viewed directly when outside the outer sleeve 102 and through the flat surface/viewing window 502 when inside the outer sleeve.

Figure 35:
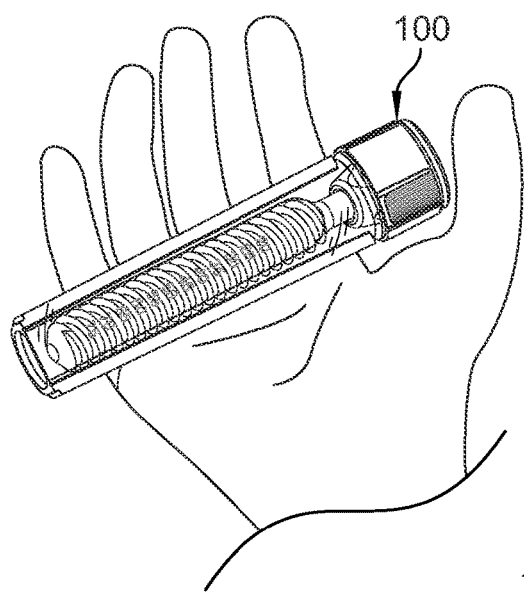
FIG. 35 illustrates a user handling an implant container according to a method of the present disclosure.
Figure 36:
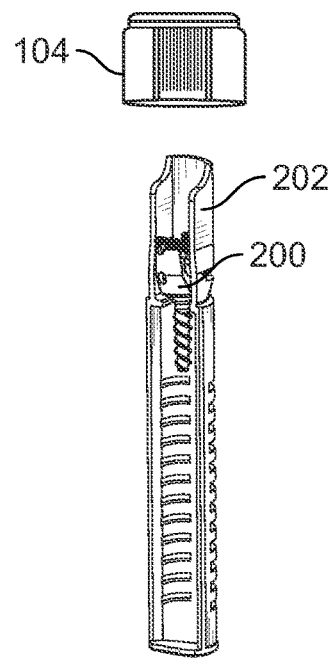
FIG. 36 illustrates shrink-wrap and label removal according to a method of the present disclosure.
Figure 36:
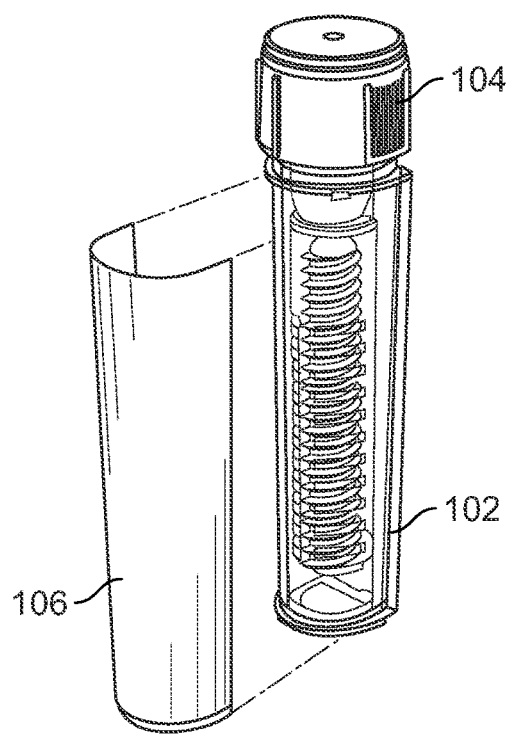
Figure 37:
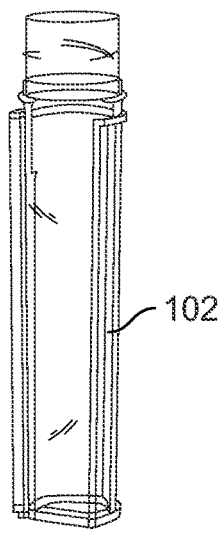
FIG. 37 illustrates opening an implant holder according to a method of the present disclosure.

FIGS. 35-39 illustrate a method of utilizing the implant container 100. As shown in FIG. 35, a user can handle and manipulate the shrink-wrapped, sealed container 100 to any degree in procuring, storing, and delivering the implant to a surgical preparation area. When ready to utilize the implant, a user can remove the shrink-wrapping and label 106, as shown in FIG. 36. In connection with doing so, a user can confirm the correct implant is within the container utilizing the label 106 and/or viewing window opposite the label. Of note is that these steps can be performed by a user in a non-sterile environment, such as a user in a preparation area outside a sterile field of a surgical procedure. The user can remove the cap 104 and any of present the open outer sleeve to a sterile user such that they can remove the implant using the inner holder 202, or the user can dump the inner holder and implant out of the outer sleeve onto a sterile surface. The opening and unloading of the container is shown in FIG. 37.

Figure 38:
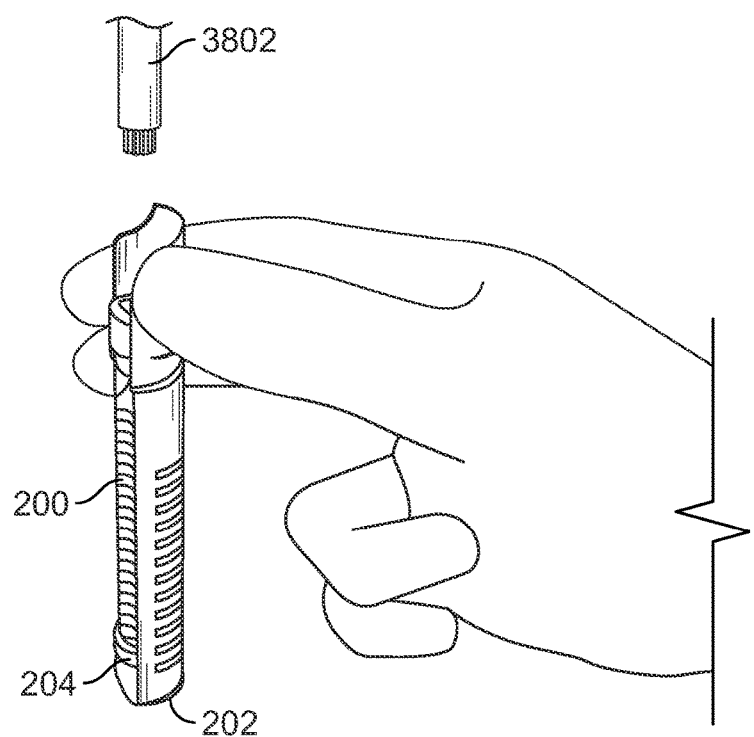
FIG. 38 illustrates handling an implant via an inner holder and coupling to an insertion instrument according to a method of the present disclosure.
Figure 39:
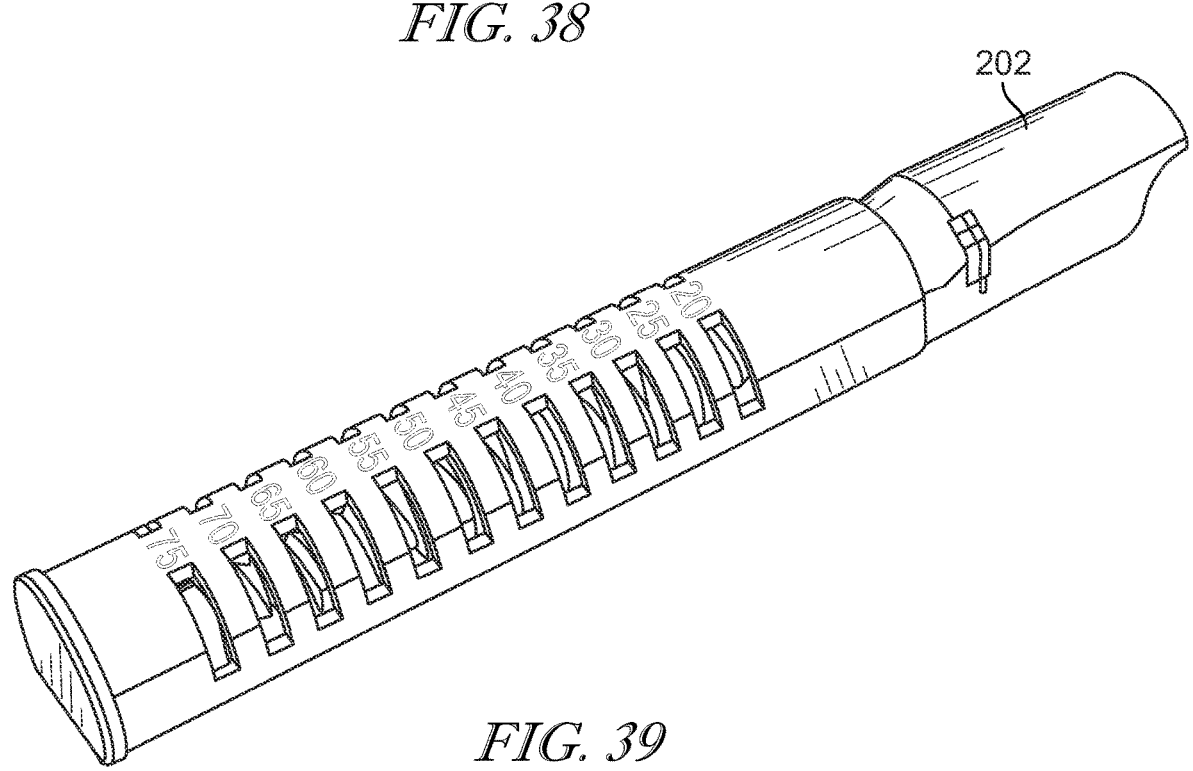
FIG. 39 illustrates inner holder recycling or disposal according to a method of the present disclosure.
Figures 40, 41:
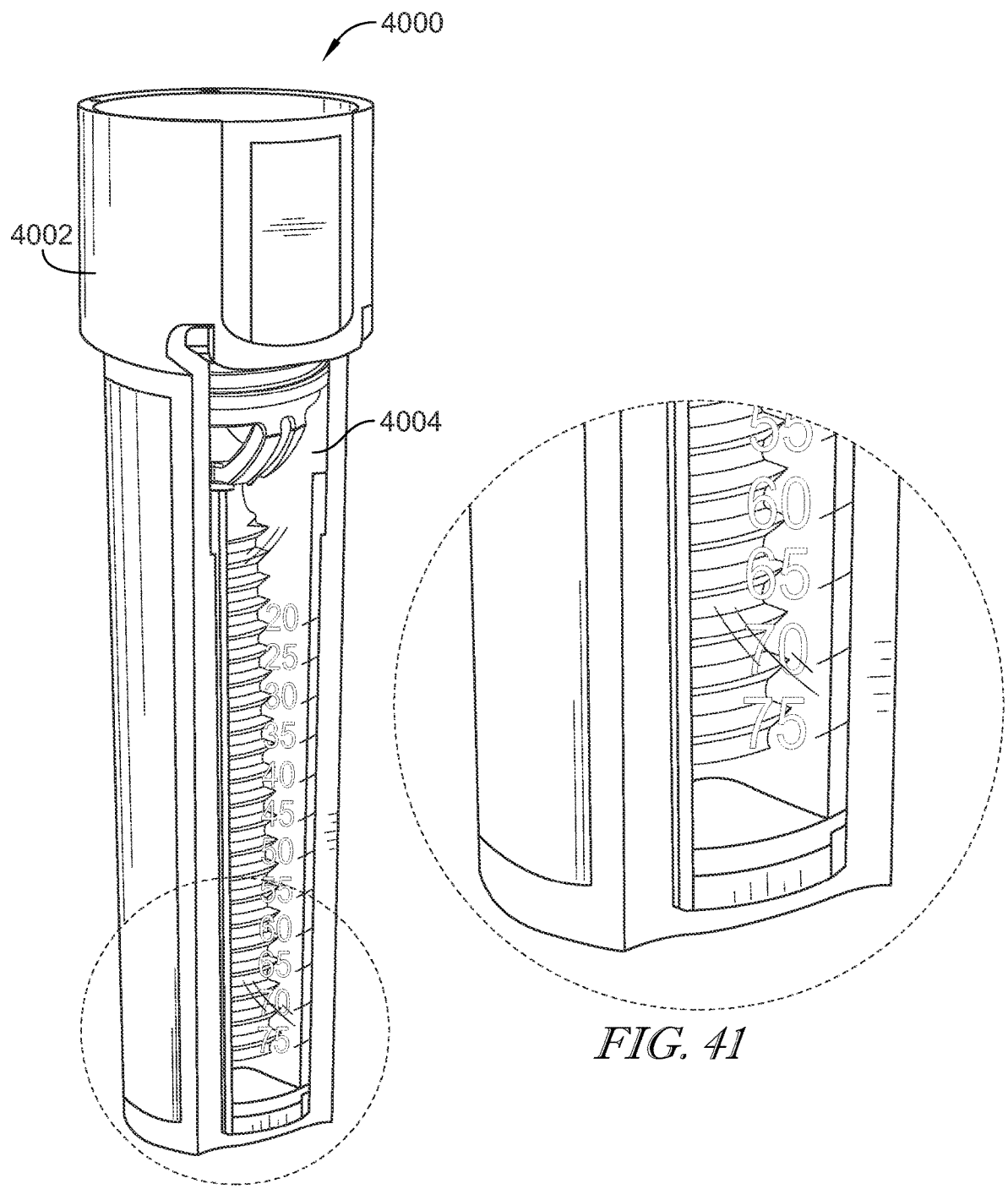
FIG. 40 illustrates a front perspective view of another embodiment of an implant container according to the present disclosure.
FIG. 41 is a front perspective detail view of the implant container of FIG. 40.
Figure 42:
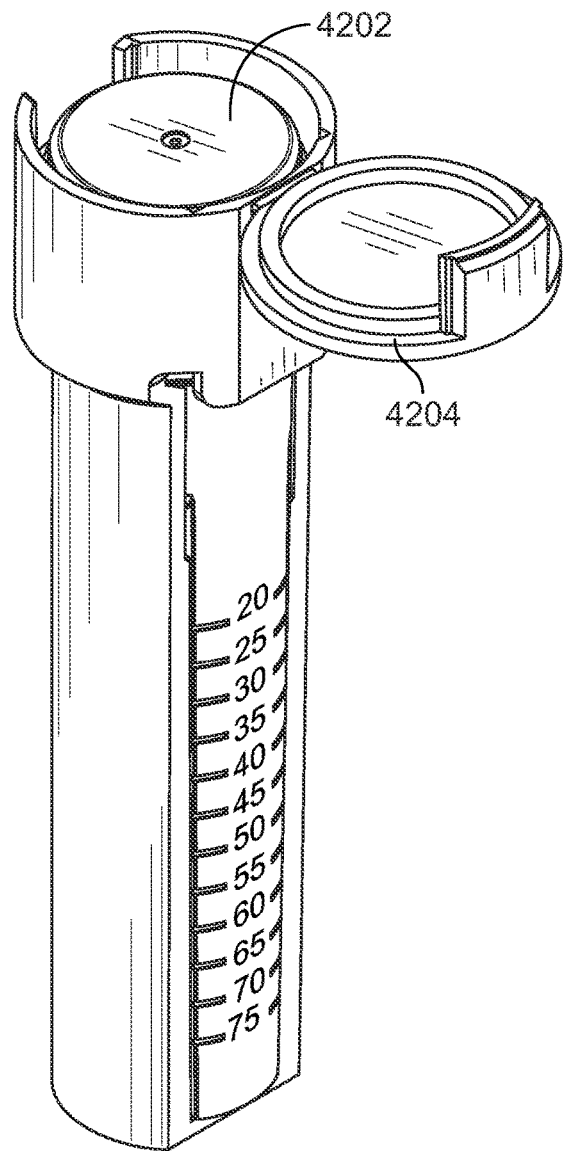
FIG. 42 is an alternative front perspective view of the implant container of FIG. 40.
Figure 43:
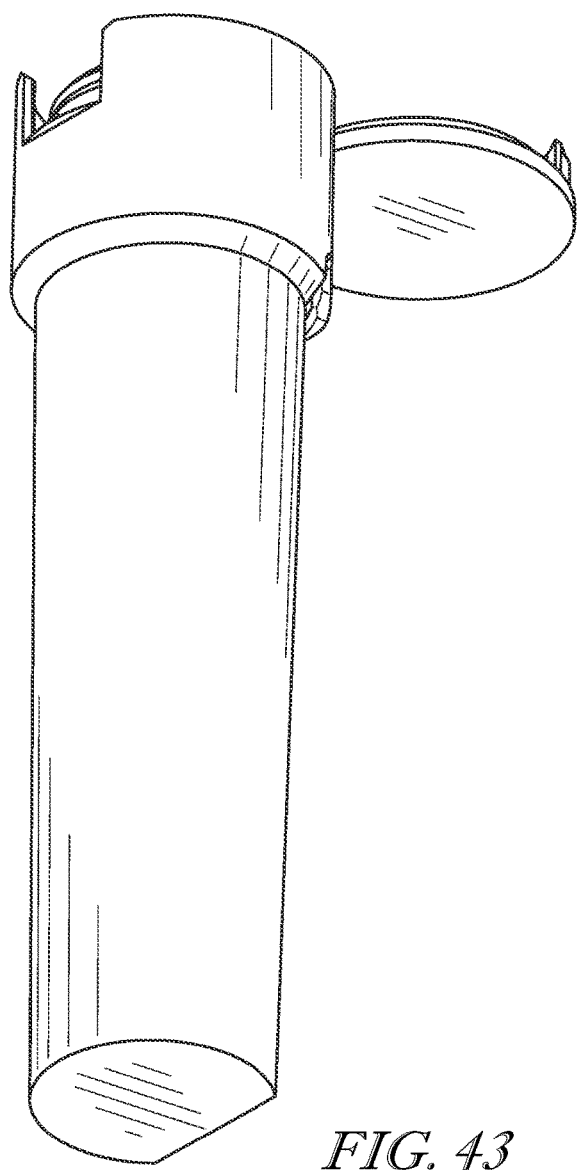
FIG. 43 is a rear perspective view of the implant container of FIG. 40.
Figure 44:
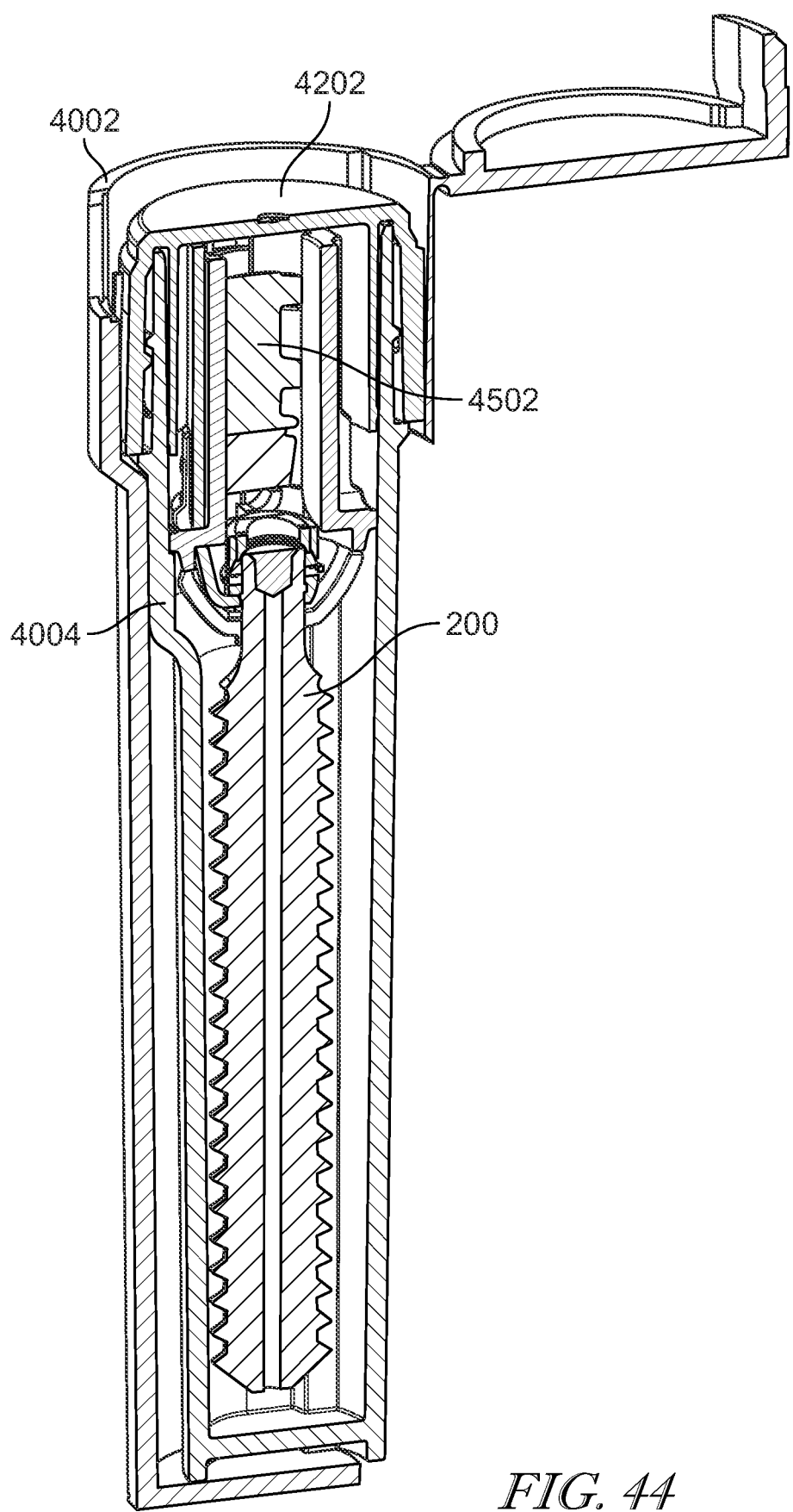
FIG. 44 is a side longitudinal cross-sectional view of the implant container of FIG. 40.
Figure 45:
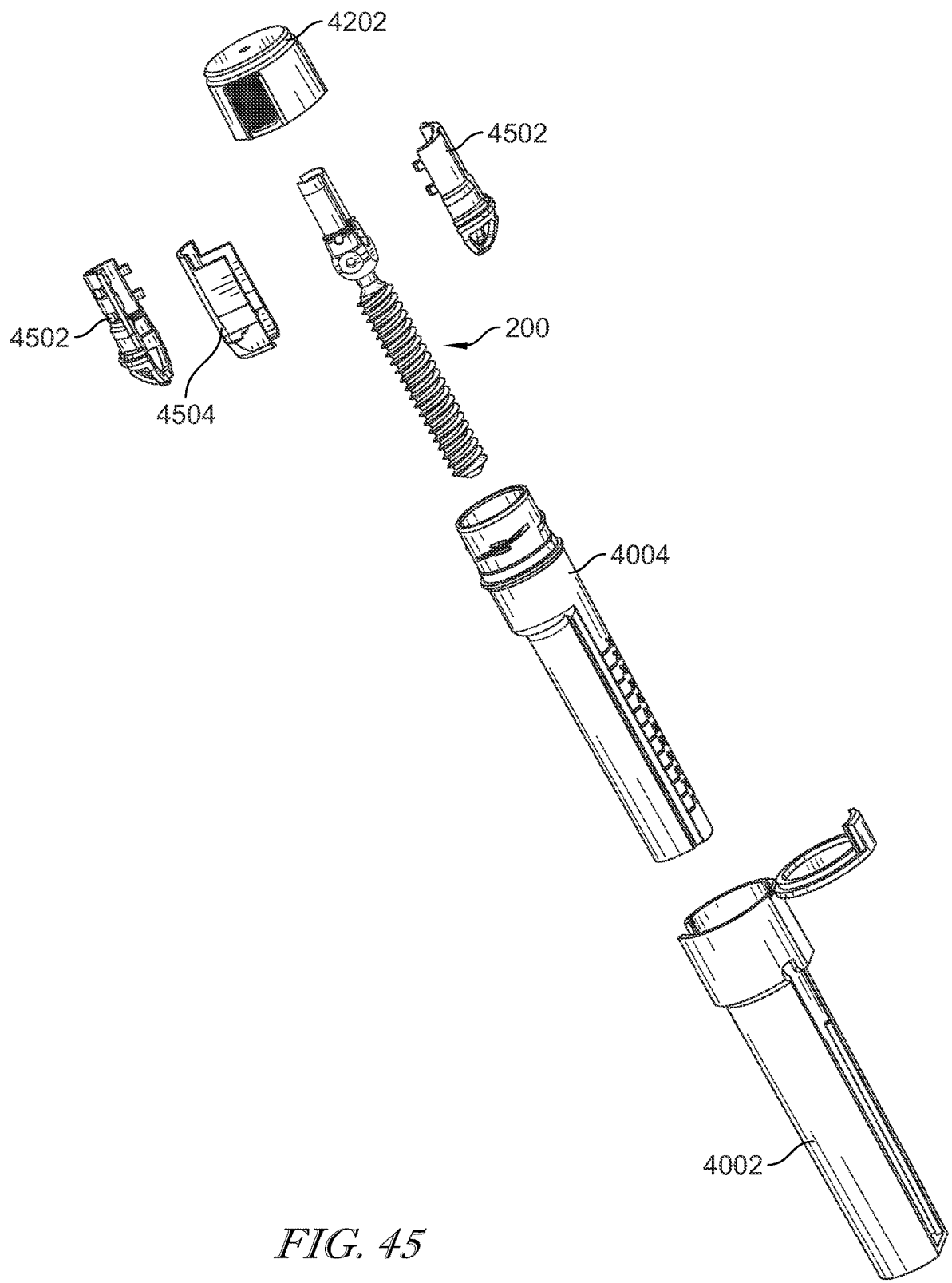
FIG. 45 is an exploded view of the implant container of FIG. 40.

A sterile user can then pick up the implant using the holder 202 in order to avoid touching the implant itself, confirm the implant is correct again using markings on the implant itself and/or the holder 202, and load the implant onto an insertion instrument 3802, such as a driver, etc., all while touching only the holder 202 and not the implant itself, as shown in FIG. 38. Once the implant is coupled to an insertion instrument, the instrument can be utilized to separate the implant from the holder 202 and the holder alone can be disposed of or recycled, as shown in FIG. 39.

FIGS. 40-58 illustrate another embodiment of an implant container 4000 according to the present disclosure. This embodiment is similar to the implant container 100 described above in many respects, so not every feature will be described in detail. The implant container 4000 can eliminate any shrink-wrapping over an outer surface thereof by providing instead a recyclable plastic outer case 4002 disposed over an outer sleeve or tube 4004. The case 4002 can protect the sterile seal between a cap 4202 and the outer sleeve 4004, protect any labels on the outer sleeve, and serve as a tamper-evident barrier.

As with the embodiment described above, the container 4000 can include features such as a fixed space for a label (either inside or outside of the case 4002, or both), anti-roll geometry with a flat surface opposite a curved surface, a viewing window to the implant within the container, including visualization of shaft length with associated markings, etc.

In some embodiments, the same implant holder 202 and tip cap 204 described above can be utilized. Utilizing this component, however, can result in a larger container size given the additional outer case 4002. Accordingly, in the illustrated embodiment different implant holders 4502, 4504 are provide that allow for a reduced-size outer sleeve 4004, thereby minimizing the overall size of the container including the outer case 4002.

Figure 46:
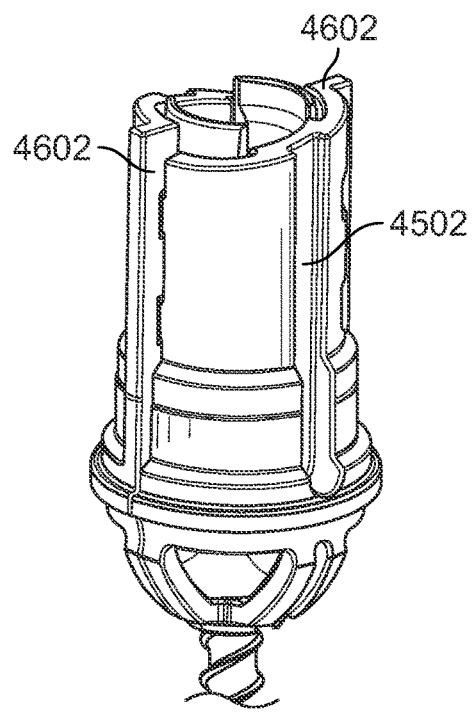
FIG. 46 is a perspective view of one embodiment of an implant holder of the implant container of FIG. 40.
Figure 47:
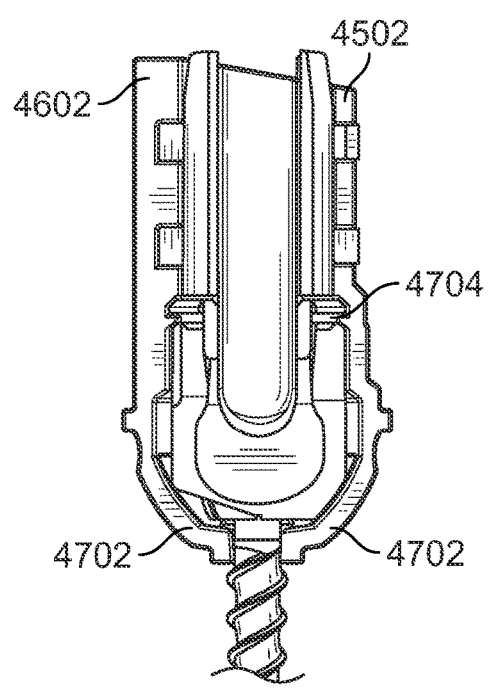
FIG. 47 is a side view of one embodiment of the implant holder of FIG. 46 holding a bone anchor receiver head with extended tabs.
Figure 48:
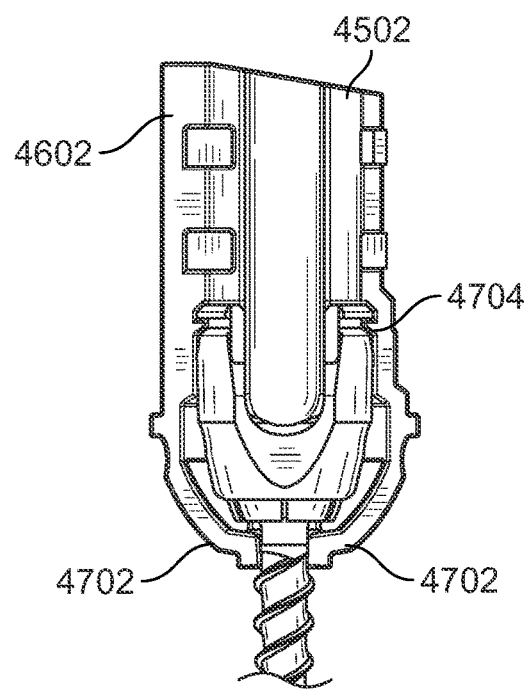
FIG. 48 is a side view of the implant holder of FIG. 46 holding a bone anchor without extended tabs.
Figure 49:
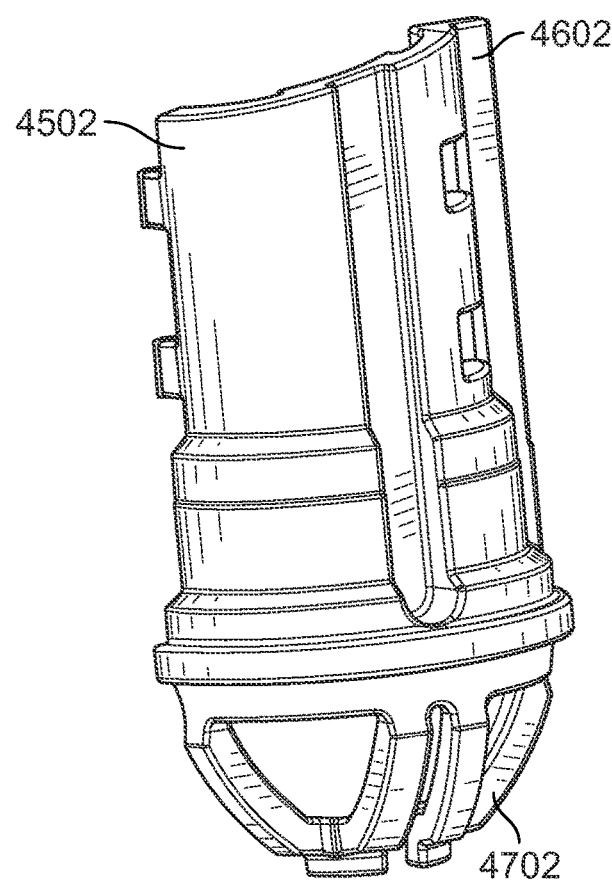
FIG. 49 is a perspective view of one half of the implant holder of FIG. 46.
Figure 50:
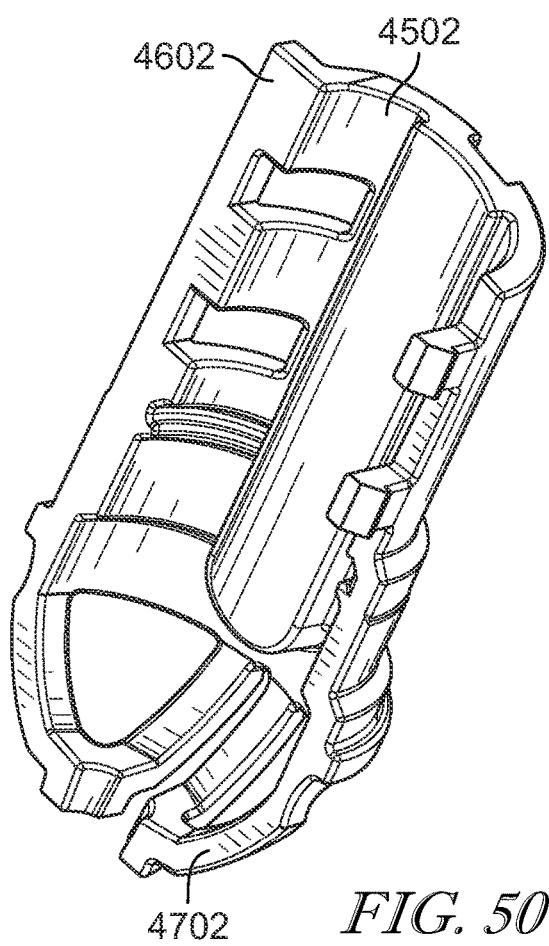
FIG. 50 is an alternate perspective view of one half of the implant holder of FIG. 46.

A first embodiment of an implant holder 4502 utilizes two interlocking identical components that together surround the receiver head of the implant and constrain its movement within the outer sleeve 4004, as shown in FIG. 46. Each holder component has sufficient length to accommodate receiver heads with proximally-extending tabs, as shown in FIG. 47, as well as more conventional receiver heads, as shown in FIG. 48. Each holder component has flexible tabs 4702 at a distal end thereof to accommodate different diameter shanks. In addition, the holder 4502 can utilize an inward projection 4704 that can be received within a groove or notch 3308 formed in the receiver head to constrain movement of the receiver head. Further, each holder component can include a tab 4602 that can be utilized to separate the holder components from one another and the receiver head when desired.

Figure 51:
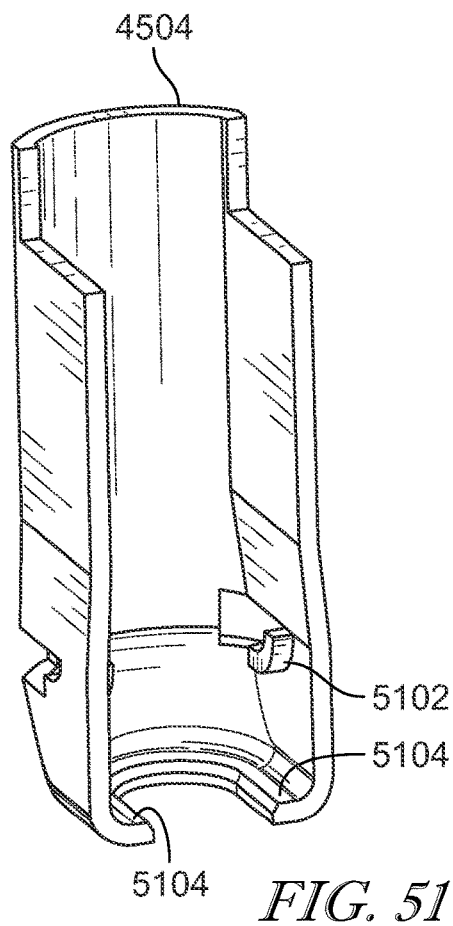
FIG. 51 is a perspective view of another embodiment of an implant holder of the implant container of FIG. 40.
Figure 52:
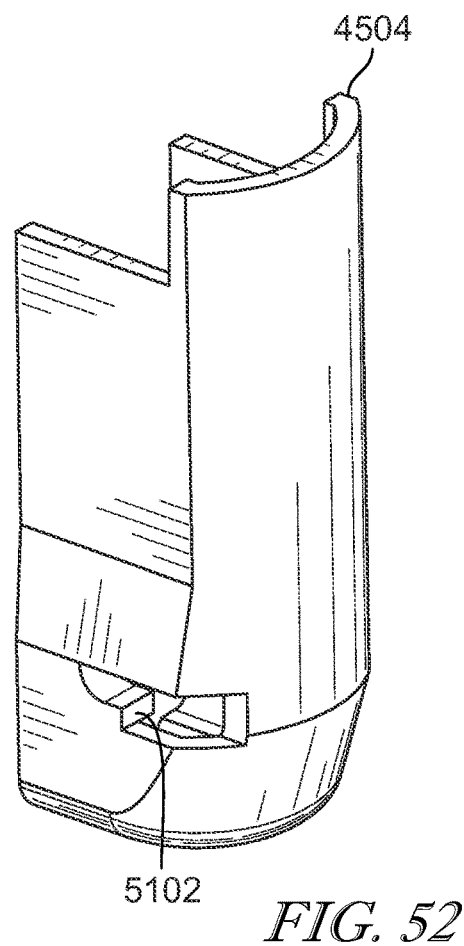
FIG. 52 is an alternate perspective view of the implant holder of FIG. 51.

The second embodiment of an implant holder 4504, shown in FIGS. 51 and 52, is a single-piece component that is similar to the proximal portion 1702 of the holder 202 described above. This component surrounds the receiver head on three sides and utilizes inward projections 5102, 5104 to constrain rotational and axial movement of the receiver head relative thereto.

Figure 53:
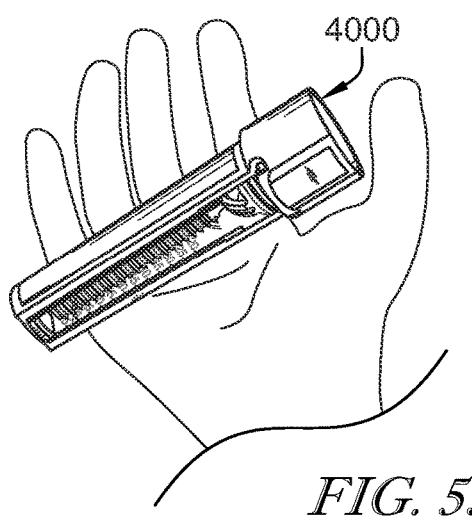
FIG. 53 illustrates a user handling and manipulating the implant container of FIG. 40 according to a method of the present disclosure.
Figure 54:
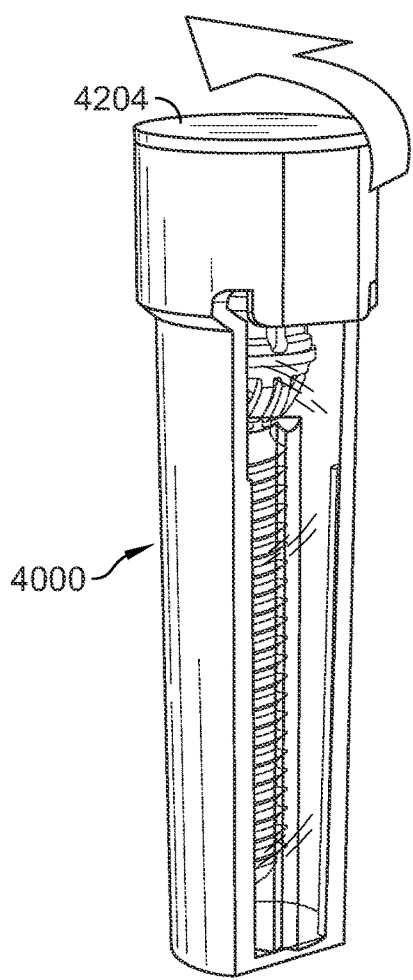
FIG. 54 illustrates pulling a break-away tab of the implant container of FIG. 40 according to a method of the present disclosure.
Figure 55:
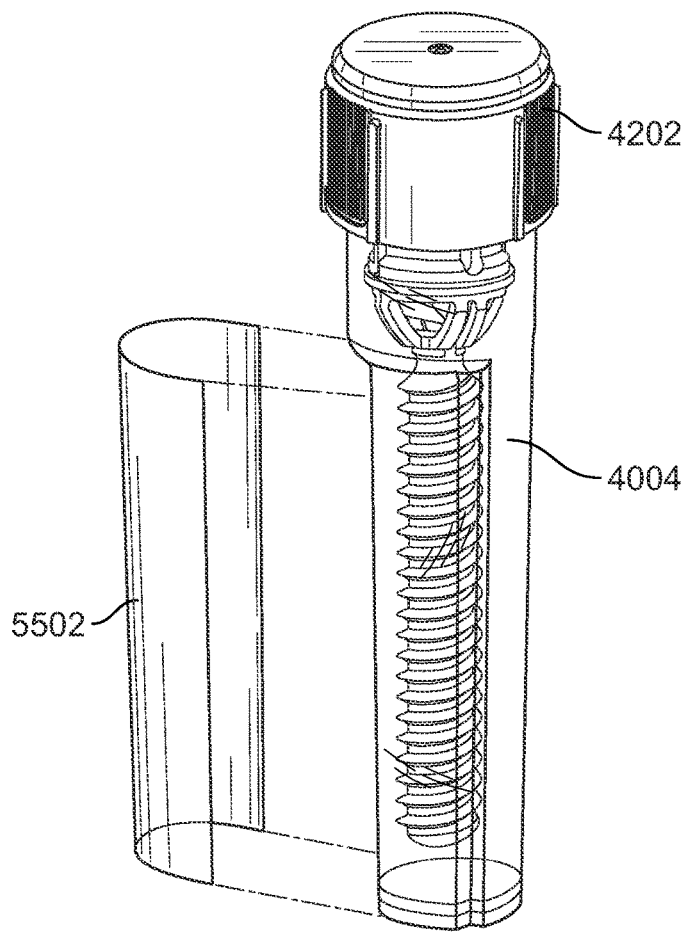
FIG. 55 illustrates confirming selection of a correct implant using a label and/or viewing window according to a method of the present disclosure.
Figure 55:
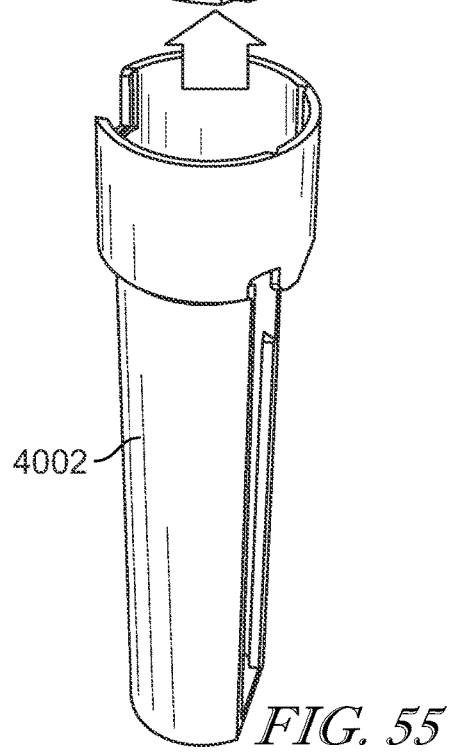
Figure 59:
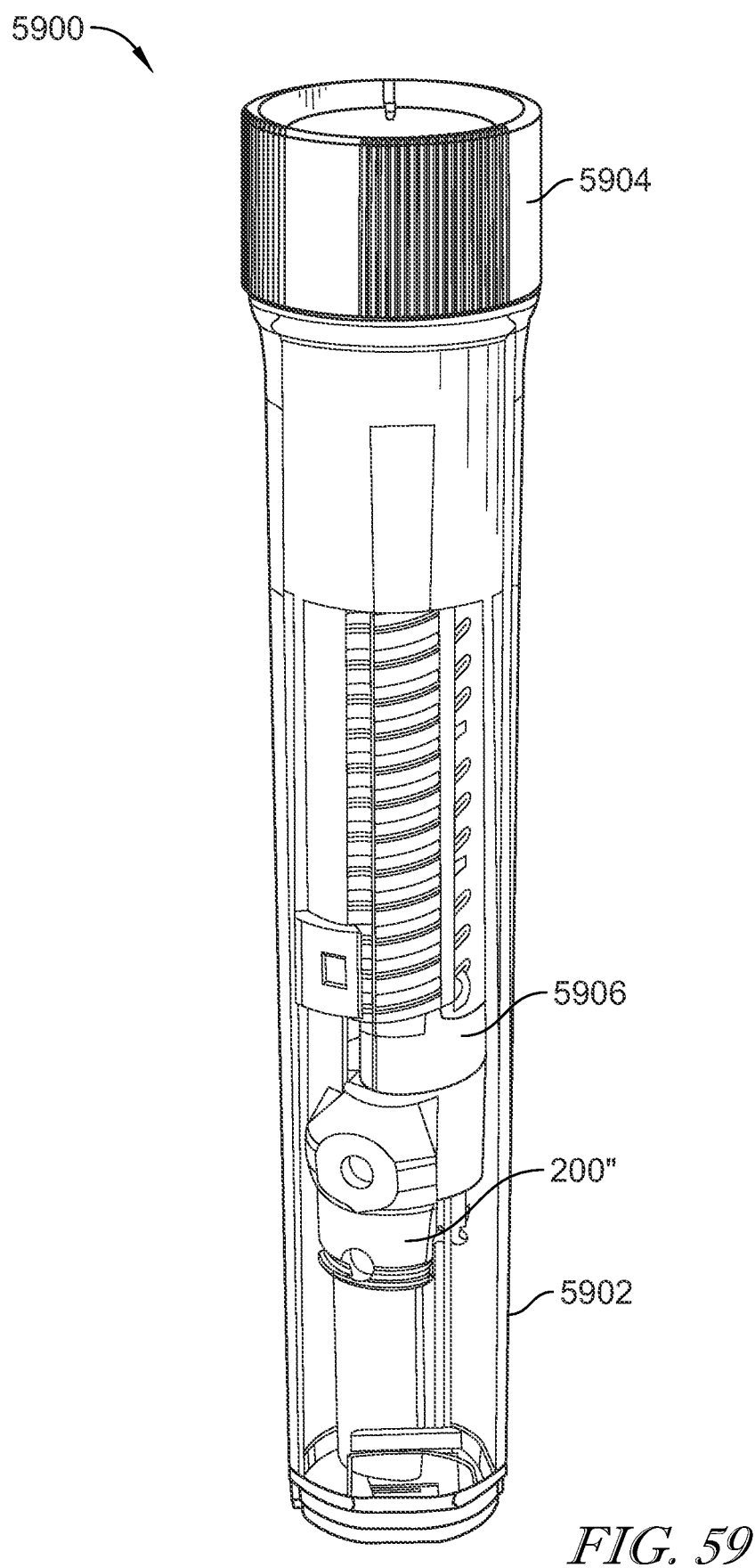
FIG. 59 illustrates another embodiment of an implant container according to the present disclosure.
Figure 60:
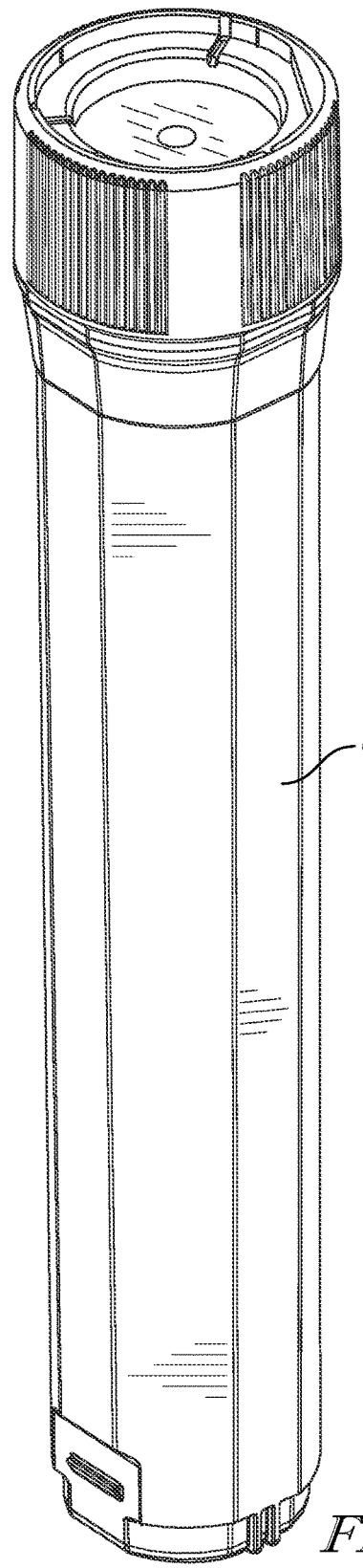
FIG. 60 is a top perspective view of the implant container of FIG. 59.
Figure 61:
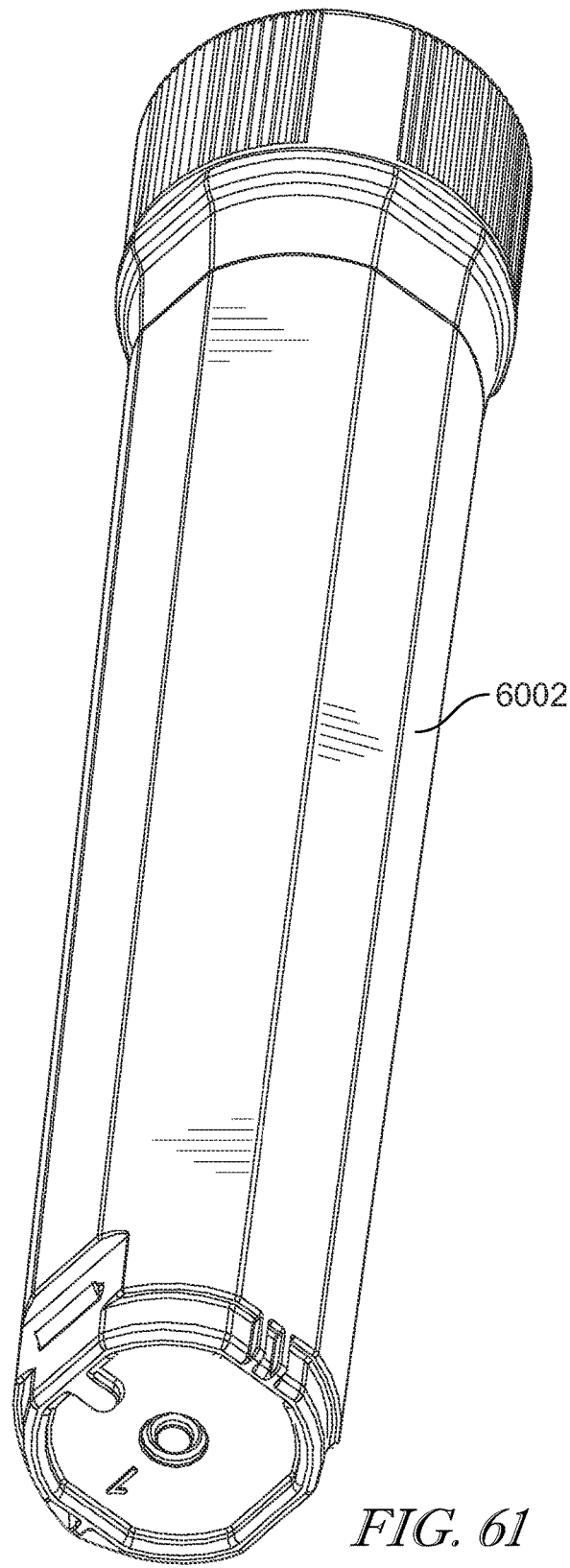
FIG. 61 is a bottom perspective view of the implant container of FIG. 59.
Figure 62:
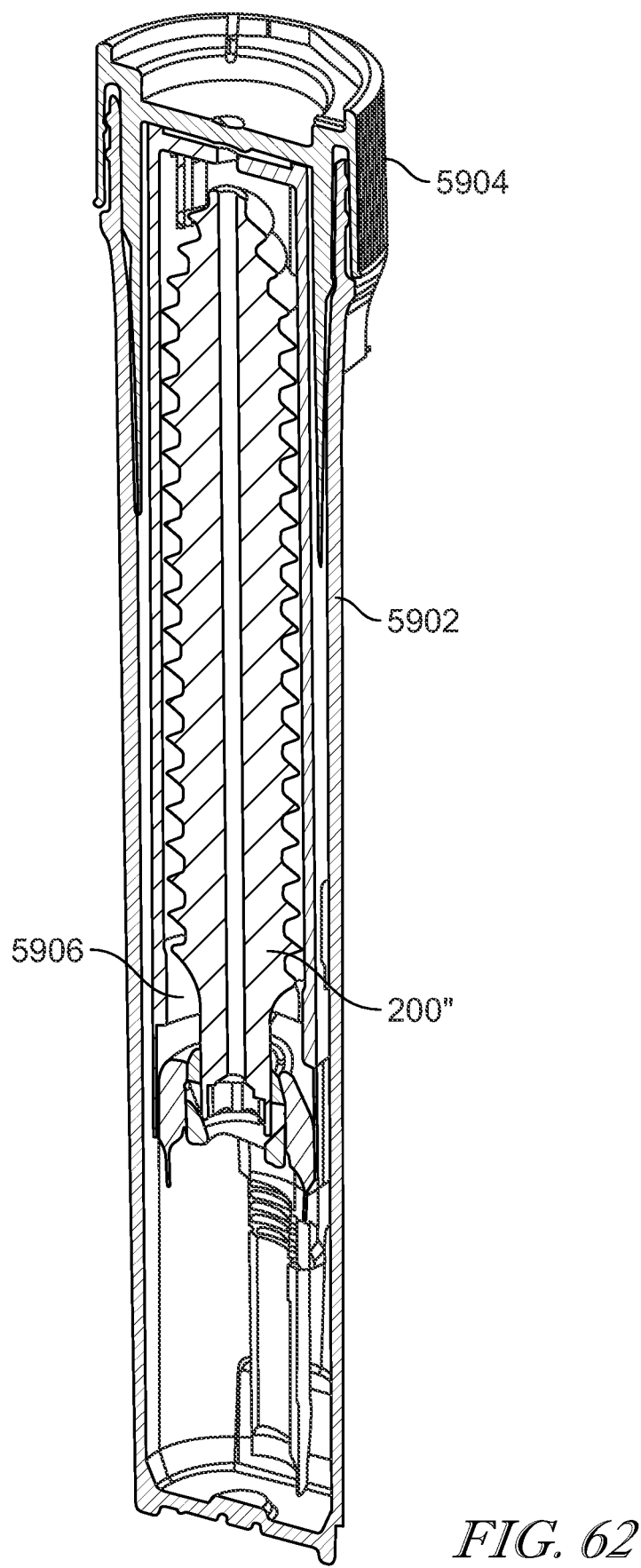
FIG. 62 is a perspective longitudinal cross-sectional view of the implant container of FIG. 59.
Figure 63:
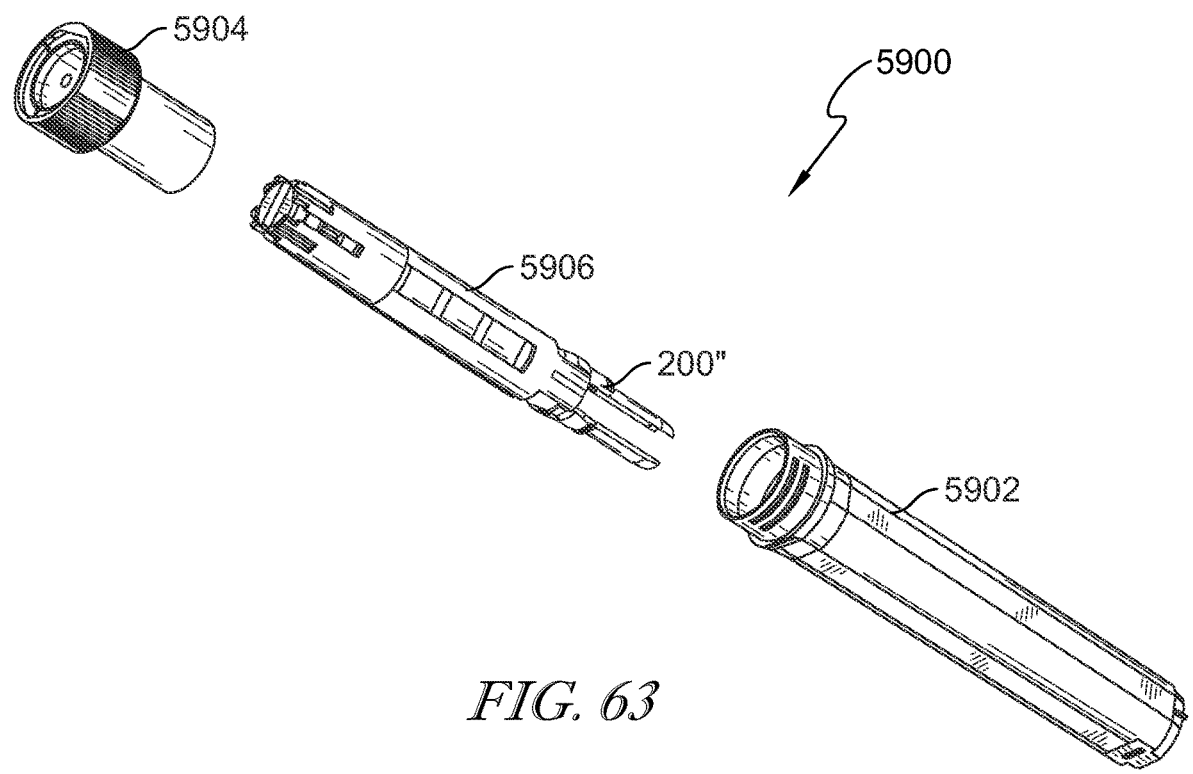
FIG. 63 is an exploded view of the implant container of FIG. 59.
Figure 64:
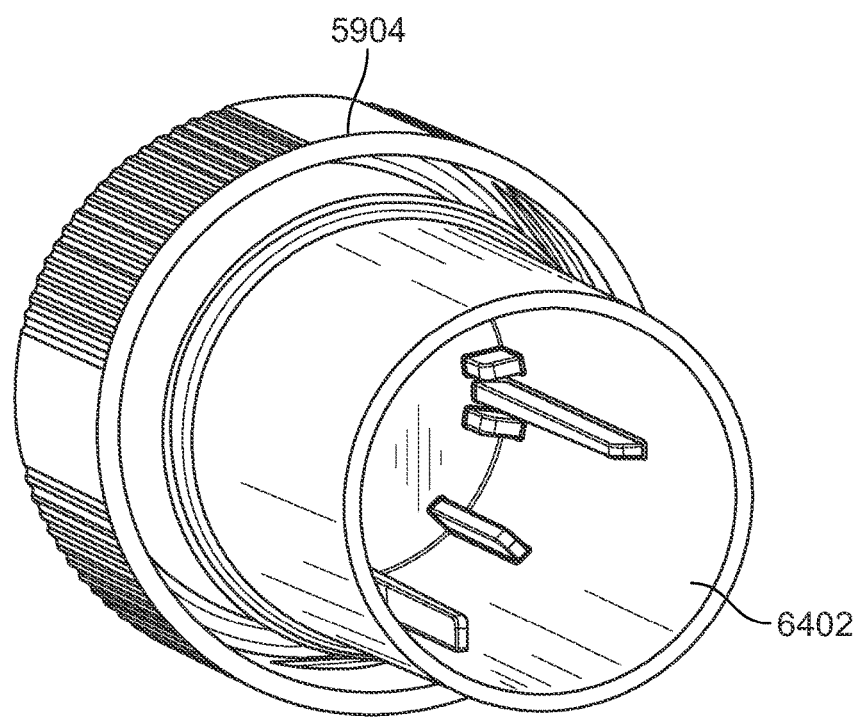
FIG. 64 is a bottom perspective view of a cap of the implant container of FIG. 59.
Figure 65:
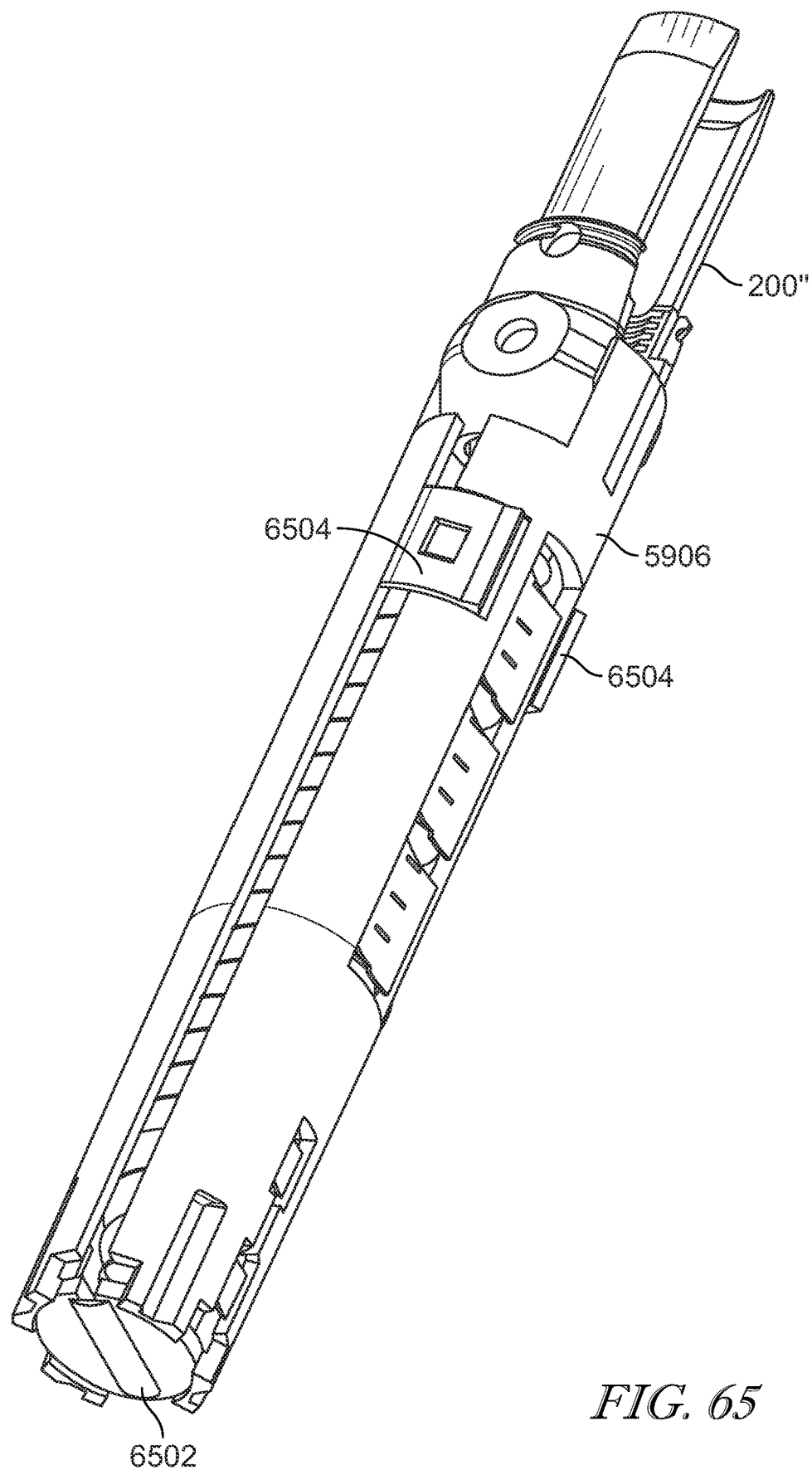
FIG. 65 is a perspective view of an inner holder of the implant container of FIG. 59 holding a bone anchor.
Figure 66:
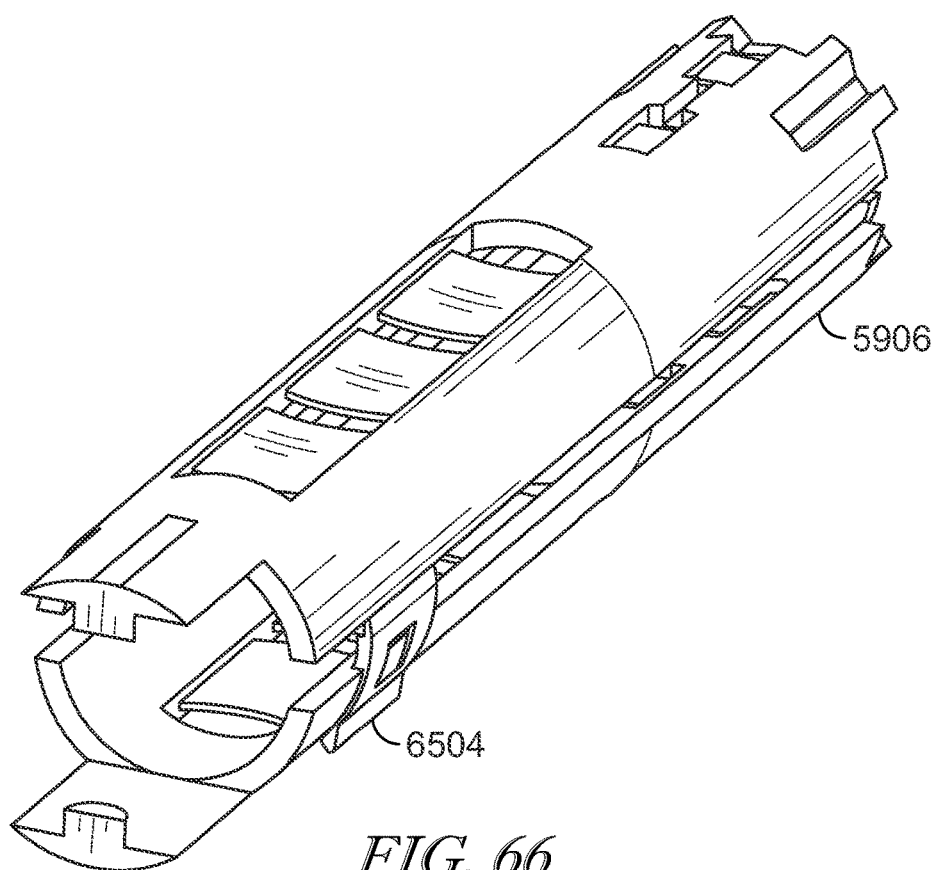
FIG. 66 is a perspective view of the inner holder of FIG. 65.
Figure 67:
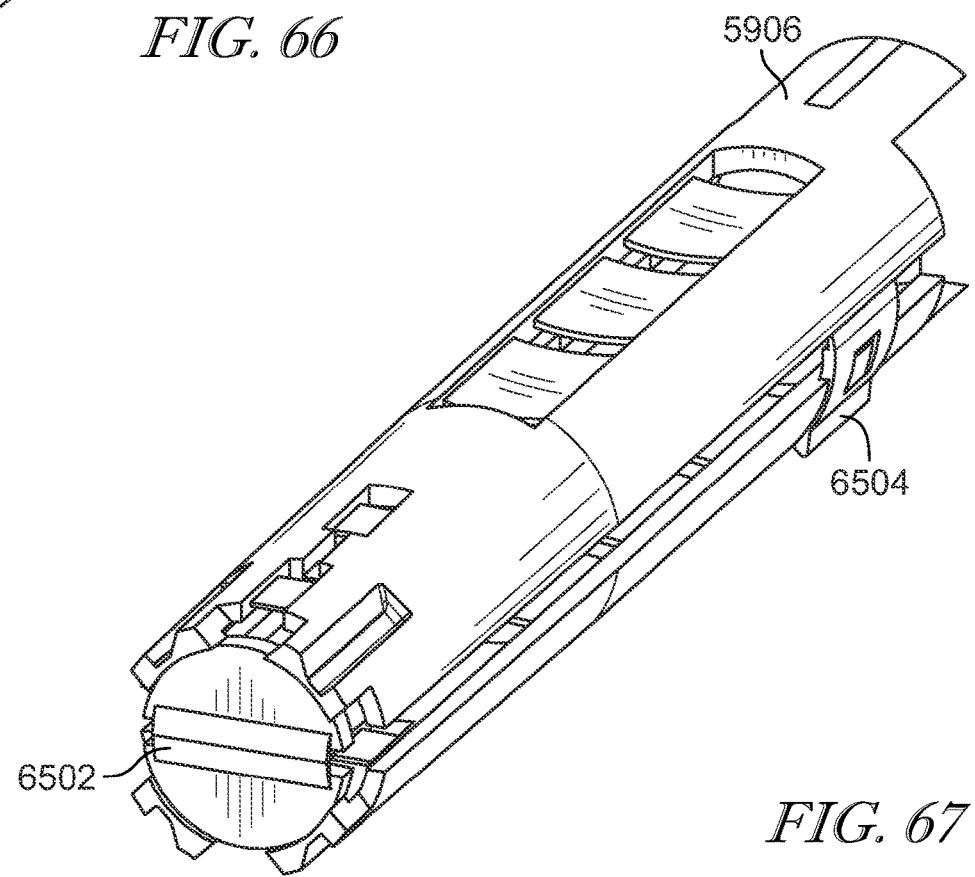
FIG. 67 is an alternative perspective view of the inner holder of FIG. 65.

FIGS. 53-58 illustrate a method of utilizing the implant container 4000. As shown in FIG. 53, a user can handle and manipulate the sealed container 4000 to any degree in procuring, storing, and delivering the implant to a surgical preparation area. When ready to utilize the implant, a user can pull a break-away tab 4204 of the outer case 4002, as shown in FIG. 54. In connection with doing so, a user can confirm the correct implant is within the container utilizing a label (e.g., label 5502 or a label on an outer surface of the case 4002 if provided) and/or viewing window opposite the label. Of note is that these steps can be performed by a user in a non-sterile environment, such as a user in a preparation area outside a sterile field of a surgical procedure. Disassembly of the outer case 4002 from the outer sleeve 4004 and the label 5502 from the outer sleeve is shown in FIG. 55. The user can remove the cap 4202 and any of present the open outer sleeve to a sterile user such that they can remove the implant using the inner holder 4502, or the user can dump the inner holder and implant out of the outer sleeve onto a sterile surface. The opening and unloading of the outer sleeve 4004 is shown in FIG. 56. A sterile user can then pick up the implant using the holder 4502 in order to avoid touching the implant itself, confirm the implant is correct again, and load the implant onto an insertion instrument 5702, such as a driver, etc., all while touching only the holder 4502 and not the implant itself, as shown in FIG. 57. Once the implant is coupled to an insertion instrument, the holder 4502 can be separated from the implant, e.g., using the tabs 4602 or, in some embodiments, the holder 4502 can be configured to separate upon coupling of the implant to the insertion instrument 5702. Following separation of the holder 4502, it can be disposed of or recycled, as shown in FIG. 58.

FIGS. 59-73 illustrate another embodiment of an implant container 5900 according to the present disclosure. This embodiment is similar in certain respects to the implant containers 100 and 4000 described above, so not every feature will be described in detail. The implant container 5900 utilizes a different configuration of an outer sleeve 5902, cap 5904, and inner holder 5906 that maintains the implant 200" in an inverted position relative to the above-described embodiments.

As with the embodiment described above, the container 5900 can include features such as a fixed space for a label 6902, flat portions 6002 to prevent rolling, and clear outer sleeve material to facilitate direct visualization of the implant within the container.

In the illustrated embodiment, the cap 5904 includes a different geometry with a distally-extending portion 6402 that is greater than in the other embodiments described above. The distally-extending portion 6402 can interference-fit with the inner holder 5906 such that the holder and implant remain coupled to the cap when it is removed from the outer sleeve 5902. Since the distally-extending portion 6402 of the cap 5904 obscures a relatively greater portion of the implant 200", the inner holder 5906 maintains the implant 200" in an inverted position where the receiver head of the implant is disposed opposite the cap. This can facilitate viewing a majority of the implant, and especially the receiver head thereof.

The inner holder 5906 is a clamshell-like folding component that includes a hinge portion 6502 and one or more locking tabs 6504 to secure the two halves in a folded configuration around the implant 200" until a user desires to separate the holder from the implant.

Figure 68:
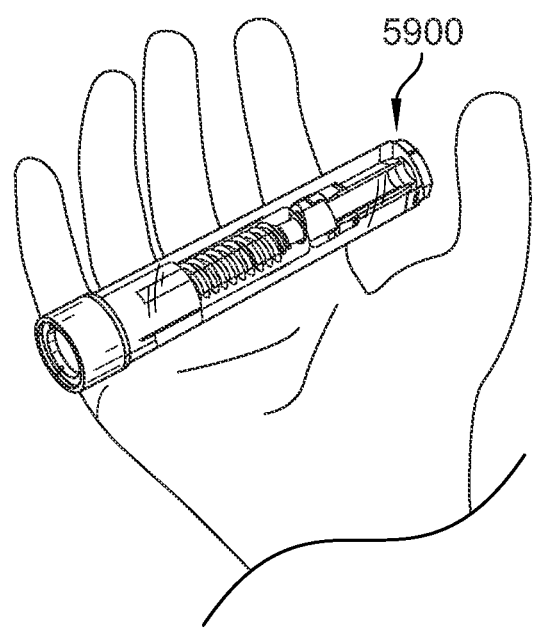
FIG. 68 illustrates a user handling and manipulating the implant container of FIG. 59 according to a method of the present disclosure.
Figure 69:
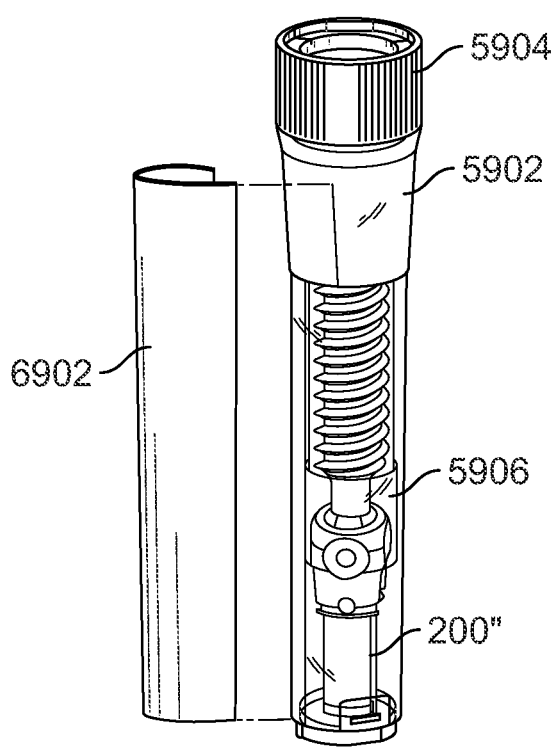
FIG. 69 illustrates removing shrink-wrapping and/or a label of the implant container of FIG. 59 and confirming selection of a correct implant according to a method of the present disclosure.
Figure 70:
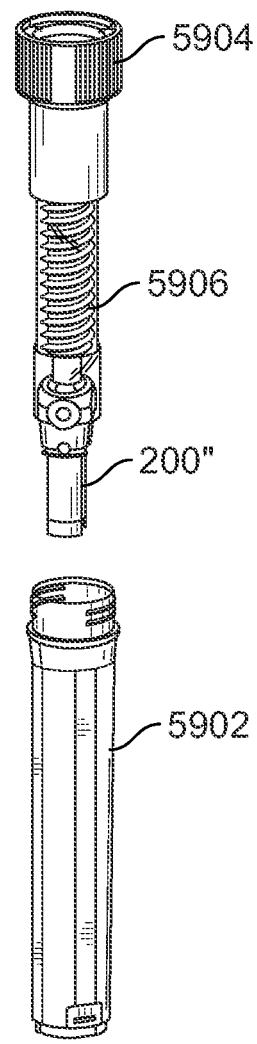
FIG. 70 illustrates removing a cap with an inner holder and implant coupled thereto according to a method of the present disclosure.

FIGS. 68-73 illustrate a method of utilizing the implant container 5900. As shown in FIG. 68, a user can handle and manipulate the sealed container 5900 to any degree in procuring, storing, and delivering the implant to a surgical preparation area. When ready to utilize the implant, a user can remove shrink-wrapping surrounding the container 5900, as well as any label 6902 disposed on an outer surface of the outer sleeve 5902, as shown in FIG. 69. In connection with doing so, a user can confirm the correct implant is within the container utilizing the label and/or viewing the implant directly. Of note is that these steps can be performed by a user in a non-sterile environment, such as a user in a preparation area outside a sterile field of a surgical procedure. The user can remove the cap 5904, with the inner holder 5906 and implant 200" coupled thereto, as shown in FIG. 70. The user can present the implant 200" and inner holder 5906 to a sterile user such that they can grasp the inner holder 5906 and separate it (along with the implant) from the cap 5904 without touching the cap or the implant directly, as shown in FIG. 71. The sterile user can then confirm the implant is correct again and load the implant onto an insertion instrument 7202, such as a driver, etc., all while touching only the holder 5906 and not the implant itself, as shown in FIG. 72. Once the implant is coupled to an insertion instrument, the holder 5906 can be separated from the implant, e.g., using the tabs 6504, and the holder can be disposed of or recycled, as shown in FIG. 73.

Various devices and methods disclosed herein can be used in minimally-invasive surgery and/or open surgery. While various devices and methods disclosed herein are generally described in the context of surgery on a human patient, the methods and devices disclosed herein can be used in any of a variety of surgical procedures with any human or animal subject, or in non-surgical procedures.

Various devices disclosed herein can be constructed from any of a variety of known materials. Example materials include those which are suitable for use in surgical applications, including metals such as stainless steel, titanium, nickel, cobalt-chromium, or alloys and combinations thereof, polymers such as PEEK, ceramics, carbon fiber, and so forth. Further, various methods of manufacturing can be utilized, including 3D printing or other additive manufacturing techniques, as well as more conventional manufacturing techniques, including molding, stamping, casting, machining, etc.

Various devices or components disclosed herein can be designed to be disposed of after a single use, or they can be designed to be used multiple times. In either case, however, various devices or components can be reconditioned for reuse after at least one use. Reconditioning can include any combination of the steps of disassembly, followed by cleaning or replacement of particular pieces, and subsequent reassembly. In particular, a device or component can be disassembled, and any number of the particular pieces or parts thereof can be selectively replaced or removed in any combination. Upon cleaning and/or replacement of particular parts, the device or component can be reassembled for subsequent use either at a reconditioning facility, or by a surgical team immediately prior to a surgical procedure. Reconditioning of a device or component can utilize a variety of techniques for disassembly, cleaning/replacement, and reassembly. Use of such techniques, and the resulting reconditioned device or component, are within the scope of the present disclosure.

Various devices or components described herein can be processed before use in a surgical procedure. For example, a new or used device or component can be obtained and, if necessary, cleaned. The device or component can be sterilized. In one sterilization technique, the device or component can be placed in a closed and sealed container, such as a plastic or TYVEK bag, or an implant container as disclosed herein. The container and its contents can be placed in a field of radiation that can penetrate the container, such as gamma radiation, x-rays, or high-energy electrons. The radiation can kill bacteria on the device or component and in the container. The sterilized device or component can then be stored in the sterile container. The sealed container can keep the instrument sterile until it is opened in the medical facility. Other forms of sterilization are also possible, including beta or other forms of radiation, ethylene oxide, steam, or a liquid bath (e.g., cold soak). Certain forms of sterilization may be better suited to use with different devices or components, or portions thereof, due to the materials utilized, the presence of electrical components, etc.

In this disclosure, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B," "one or more of A and B," and "A and/or B" are each intended to mean "A alone, B alone, or A and B together." A similar interpretation is also intended for lists including three or more items. For example, the phrases "at least one of A, B, and C," "one or more of A, B, and C," and "A, B, and/or C" are each intended to mean "A alone, B alone, C alone, A and B together, A and C together, B and C together, or A and B and C together." In addition, use of the term "based on," is intended to mean, "based at least in part on," such that an un-recited feature or element is also permissible.

Further features and advantages based on the above-described embodiments are possible and within the scope of the present disclosure. Accordingly, the disclosure is not to be limited by what has been particularly shown and described. All publications and references cited herein are expressly incorporated herein by reference in their entirety, except for any definitions, subject matter disclaimers, or disavowals, and except to the extent that the incorporated material is inconsistent with the express disclosure herein, in which case the language in this disclosure controls.

Examples of the above-described embodiments can include the following:

1. An implant container, comprising:
    an outer sleeve having a sealed first end and an open second end;
    a cap configured to selectively seal the second end of the outer sleeve; and
    an inner holder configured to be disposed within the outer sleeve, the inner holder being configured to receive an implant and constrain movement of the implant relative to the inner holder.
2. The container of claim 1, wherein the outer sleeve includes at least one flat portion to prevent rolling.
3. The container of claim 2, wherein the at least one flat portion is transparent and presents a window to view the contents of the outer sleeve.
4. The container of any of claims 1 to 3, wherein a shape of the outer sleeve and a shape of the inner holder are configured such that the inner holder can be disposed within the outer sleeve in only one orientation.
5. The container of any of claims 1 to 4, further comprising a tip cap having a projection configured to be received within a slot formed along a length of the inner holder.
6. The container of any of claims 1 to 5, wherein the inner holder includes a plurality of inward projections configured to constrain movement of the implant.

7. The container of any of claims 1 to 4, wherein the inner holder includes a plurality of identical interlocking components configured to surround a portion of an implant when assembled.
8. The container of any of claims 1 to 4, wherein the inner holder includes opposed portions connected by a hinge portion such that the opposed portions are configured to surround a portion of an implant when pivoted toward one another about the hinge portion.
9. The container of any of claims 1 to 8, wherein the outer sleeve includes markings formed thereon to denote a length of an implant disposed within the container.
10. The container of any of claims 1 to 9, further comprising a label disposed on an outer surface of the outer sleeve.
11. The container of any of claims 1 to 10, further comprising an outer case disposed over a portion of the outer sleeve.
12. A method, comprising:
    removing a cap from an outer sleeve to expose an open end of the outer sleeve, the outer sleeve containing an inner holder and an implant;
    passing the inner holder and the implant into a sterile field without contaminating the inner holder and the implant;
    coupling the implant to a surgical instrument without directly contacting the implant by any component other than the surgical instrument;
    separating the inner holder from the implant after coupling the implant to the surgical instrument.
13. The method of claim 12, further comprising removing a sealed cover from the outer sleeve prior to removing the cap from the outer sleeve.
14. The method of claim 13, wherein the sealed cover is shrink-wrapping.
15. The method of claim 13, wherein the sealed cover is an outer case with a break-away tab.
16. The method of any of claims 12 to 15, further comprising confirming a length of the implant using a viewing window formed in the outer sleeve and length markings formed on the viewing window.
17. The method of any of claims 12 to 16, wherein separating the inner holder from the implant includes exerting opposite forces on tabs extending from a plurality of interlocking components of the holder.
18. The method of any of claims 12 to 16, wherein separating the inner holder from the implant includes releasing locking tabs and folding opposed portions of the inner holder away from one another about a hinge portion of the inner holder.

What is claimed is:
1. An implant container, comprising:
   an outer sleeve having a sealed first end and an open second end;
   a cap configured to selectively seal the second end of the outer sleeve;
   an inner holder disposed within the outer sleeve, the inner holder being configured to receive an implant and constrain movement of the implant relative to the inner holder; and
   a slot formed through a sidewall along a length of the inner holder and
   a tip cap disposed within the inner holder, the tip cap having a projection received within the slot, wherein a longitudinal axis of the slot extends perpendicular to a longitudinal axis of the inner holder.

2. The container of claim 1, wherein the outer sleeve includes at least one flat portion to prevent rolling.
3. The container of claim 2, wherein the at least one flat portion is transparent and presents a window to view the contents of the outer sleeve.
4. The container of claim 1, wherein a shape of the outer sleeve and a shape of the inner holder are configured such that the inner holder can be disposed within the outer sleeve in only one orientation.
5. The container of claim 1, wherein the inner holder includes a plurality of inward projections configured to constrain movement of the implant.
6. The container of claim 1, wherein the inner holder includes a plurality of identical interlocking components configured to surround a portion of an implant when assembled.
7. The container of claim 1, wherein the inner holder includes opposed portions connected by a hinge portion such that the opposed portions are configured to surround a portion of an implant when pivoted toward one another about the hinge portion.
8. The container of claim 1, wherein the outer sleeve includes markings formed thereon to denote a length of an implant disposed within the container.
9. The container of claim 1, further comprising a label disposed on an outer surface of the outer sleeve.
10. The container of claim 1, wherein the tip cap is disposed perpendicular to a longitudinal axis of the implant.
11. The container of claim 1, wherein the tip cap includes a lip formed opposite the projection and the lip is configured to constrain movement of a distal shank of the implant.
12. The container of claim 1, wherein the slot is one of a plurality of slots formed consecutively through a sidewall along a length of the inner holder.
13. The container of claim 5, wherein the plurality of projections includes a distal set of projections configured to abut against a distal-most surface of a proximal head of the implant and constrain distal movement of the implant relative to the inner holder.
14. The container of claim 5, wherein the plurality of projections includes a second set of projections proximal to the distal set of projections, the second set of projections configured to extend into the proximal head of the implant and constrain proximal movement of the implant relative to the inner holder.
15. An implant container, comprising:
    an outer sleeve having a sealed first end and an open second end;
    a cap configured to selectively seal the second end of the outer sleeve; and
    an inner holder disposed within the outer sleeve, the inner holder being configured to receive an implant and constrain movement of the implant relative to the inner holder;
    wherein the inner holder includes a plurality of inward projections configured to constrain movement of the implant, the plurality of inward projections comprising a distal set of projections configured to prevent distal movement of the implant relative to the inner holder and a proximal set of projections configured to prevent proximal movement of the implant relative to the holder.
16. The container of claim 15, wherein the implant is a bone anchor having a proximal head portion and a distal shank portion configured to penetrate bone; and
    wherein the distal set of projections are configured to abut against a distal-most surface of the proximal head portion and the proximal set of projections are configured to extend into the proximal head portion.

17. The container of claim 1, wherein the implant is a bone anchor having a proximal head portion and a distal shank portion configured to penetrate bone.

* * * * *